US012073762B2

(12) United States Patent
Yuan et al.

(10) Patent No.: US 12,073,762 B2
(45) Date of Patent: *Aug. 27, 2024

(54) PIXEL DRIVING CIRCUIT, PIXEL DRIVING METHOD, DISPLAY PANEL AND DISPLAY DEVICE

(71) Applicant: BOE Technology Group Co., Ltd., Beijing (CN)

(72) Inventors: Lijun Yuan, Beijing (CN); Can Zhang, Beijing (CN); Ning Cong, Beijing (CN); Wei Li, Beijing (CN); Can Wang, Beijing (CN); Jinfei Niu, Beijing (CN); Jingjing Zhang, Beijing (CN); Minghua Xuan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,715

(22) Filed: Jun. 7, 2023

(65) Prior Publication Data

US 2023/0335036 A1 Oct. 19, 2023

Related U.S. Application Data

(63) Continuation of application No. 17/530,853, filed on Nov. 19, 2021, now Pat. No. 11,694,597.

(30) Foreign Application Priority Data

Mar. 23, 2021 (CN) ........................ 202110307960.2

(51) Int. Cl.
*G09G 3/20* (2006.01)

(52) U.S. Cl.
CPC ... *G09G 3/2092* (2013.01); *G09G 2300/0426* (2013.01); *G09G 2310/0278* (2013.01); *G09G 2310/061* (2013.01)

(58) Field of Classification Search
CPC ......... G09G 3/2092; G09G 2300/0426; G09G 2310/0278; G09G 2310/061;
(Continued)

(56) References Cited

U.S. PATENT DOCUMENTS 4,865,207 A * 9/1989 Joyner ...................... A61J 9/04 215/11.1
5,327,764 A * 7/1994 Weykamp ............ B21D 26/021 72/296
(Continued)

FOREIGN PATENT DOCUMENTS

CN 104778918 A 7/2015
CN 107068059 A 8/2017
(Continued)

OTHER PUBLICATIONS

Office Action dated Nov. 29, 2021 issued in corresponding Chinese Application No. 202110307960.2.

*Primary Examiner* — Jose R Soto Lopez
(74) *Attorney, Agent, or Firm* — Nath, Goldberg & Meyer; Joshua B. Goldberg

(57) ABSTRACT

The pixel driving circuit includes a current control sub-circuit configured to output a gray scale current signal to an element to be driven, and a gating sub-circuit. The gating sub-circuit is coupled to a scan signal terminal, a reset signal terminal, a gating data signal terminal and a pulse voltage signal terminal; the gating sub-circuit is configured to drive the element to be driven to continuously emit light under the control of a scan signal from the scan signal terminal and a gating data signal from the gating data signal terminal, and to drive the element to be driven to intermittently emit light under the control of a reset signal from the reset signal terminal, the gating data signal from the gating data signal terminal, and a pulse voltage signal from the pulse voltage signal terminal.

19 Claims, 13 Drawing Sheets

(58) Field of Classification Search
CPC ... G09G 2300/0819; G09G 2300/0852; G09G 2300/0861; G09G 2310/0251; G09G 2310/0262; G09G 3/32
See application file for complete search history.

(56) References Cited

U.S. PATENT DOCUMENTS

| | | | | |
|---|---|---|---|---|
| 5,907,001 | A * | 5/1999 | Foucher | C08F 290/124 522/149 |
| 7,956,831 | B2 * | 6/2011 | Roush | G09G 3/3233 345/82 |
| 8,149,186 | B2 * | 4/2012 | Kim | G09G 3/3233 315/169.3 |
| 8,937,615 | B2 * | 1/2015 | Kim | G09G 3/3233 345/211 |
| 9,466,244 | B2 * | 10/2016 | Takahara | G09G 3/006 |
| 9,779,657 | B2 * | 10/2017 | Kim | G09G 3/3233 |
| 9,984,618 | B2 * | 5/2018 | Sarrasin | G09G 3/2081 |
| 10,699,675 | B2 * | 6/2020 | Wang | G09G 3/2081 |
| 10,748,473 | B2 * | 8/2020 | Yang | H03K 25/02 |
| 10,825,380 | B2 * | 11/2020 | Kim | H01L 25/0753 |
| 10,872,567 | B2 * | 12/2020 | Zhang | G09G 3/3258 |
| 10,978,002 | B2 | 4/2021 | Yue et al. | |
| 11,158,242 | B2 * | 10/2021 | Yue | G09G 3/32 |
| 11,195,860 | B2 * | 12/2021 | Kasahara | H01L 27/1255 |
| 11,282,436 | B2 * | 3/2022 | Gai | G09G 3/3233 |
| 11,282,462 | B2 * | 3/2022 | Lin | G09G 3/3233 |
| 11,361,701 | B1 * | 6/2022 | Tung | H03K 17/6871 |
| 11,694,597 | B2 * | 7/2023 | Yuan | G09G 3/2092 345/204 |
| 2004/0041525 | A1 * | 3/2004 | Park | G09G 3/3241 315/169.3 |
| 2005/0168417 | A1 * | 8/2005 | Ha | G09G 3/2011 345/76 |
| 2006/0022305 | A1 * | 2/2006 | Yamashita | G09G 3/2014 257/565 |
| 2006/0092146 | A1 * | 5/2006 | Johnson | G09G 3/3233 345/204 |
| 2006/0158396 | A1 * | 7/2006 | Jo | G09G 3/3283 345/76 |
| 2006/0164345 | A1 * | 7/2006 | Sarma | G09G 3/30 345/76 |
| 2007/0097040 | A1 * | 5/2007 | Miyazawa | G06K 15/1209 345/77 |
| 2011/0102403 | A1 * | 5/2011 | Kim | G09G 3/3233 345/76 |
| 2015/0042692 | A1 * | 2/2015 | Kim | G09G 3/3233 345/82 |
| 2016/0232848 | A1 * | 8/2016 | Meng | G09G 3/3258 |
| 2019/0005877 | A1 * | 1/2019 | Dong | G09G 3/3266 |
| 2019/0096317 | A1 * | 3/2019 | Chen | G09G 3/3233 |
| 2019/0096327 | A1 * | 3/2019 | Peng | G09G 3/3241 |
| 2019/0228696 | A1 * | 7/2019 | Li | G09G 3/2003 |
| 2019/0371231 | A1 * | 12/2019 | Kim | G09G 3/2081 |
| 2020/0035184 | A1 * | 1/2020 | Luo | G09G 3/3677 |
| 2020/0036507 | A1 * | 1/2020 | Matsui | H04L 7/027 |
| 2020/0211464 | A1 * | 7/2020 | Yue | G09G 3/3266 |
| 2020/0335042 | A1 * | 10/2020 | Son | G09G 3/3291 |
| 2021/0020109 | A1 * | 1/2021 | Lin | H10K 59/1213 |
| 2021/0035493 | A1 * | 2/2021 | Hashimoto | G09G 3/2081 |
| 2021/0201760 | A1 * | 7/2021 | Wang | G09G 3/3233 |
| 2021/0366364 | A1 * | 11/2021 | Xuan | G09G 3/32 |
| 2022/0005403 | A1 * | 1/2022 | Yue | G09G 3/3233 |
| 2022/0036833 | A1 * | 2/2022 | Park | G09G 3/2003 |
| 2022/0059021 | A1 * | 2/2022 | Xuan | G09G 3/32 |
| 2022/0148493 | A1 * | 5/2022 | Xuan | G09G 3/32 |

FOREIGN PATENT DOCUMENTS

| | | | |
|---|---|---|---|
| CN | 108010489 | A | 5/2018 |
| CN | 109872680 | A | 6/2019 |
| CN | 110021264 | A | 7/2019 |
| CN | 111223444 | A | 6/2020 |
| CN | 113053299 | A | 6/2021 |
| JP | 2008310361 | A | 12/2008 |
| KR | 20160101572 | A | 8/2016 |

* cited by examiner

PIXEL DRIVING CIRCUIT, PIXEL DRIVING METHOD, DISPLAY PANEL AND DISPLAY DEVICE

CROSS-REFERENCE TO RELATED APPLICATIONS

The present application claims the priority of the Chinese Patent Application No. 202110307960.2 entitled "pixel driving circuit, pixel driving method, display panel and display device" filed on Mar. 23, 2021, the content of which is incorporated herein by reference in its entirety.

TECHNICAL FIELD

The present disclosure relates to the field of display technology, and in particular, to a pixel driving circuit, a pixel driving method, a display panel, and a display device.

BACKGROUND

A micro light emitting diode has the characteristics of high light emitting efficiency at high current density, low light emitting efficiency and main wave peak shifting at low current density. The concrete performance is as follows: when the driving current input into the micro light emitting diode reaches a certain value, the light emitting efficiency of the micro light emitting diode reaches its highest: when the driving current does not reach the value, the light emitting efficiency of the micro light emitting diode is always in a climbing phase, that is, the light emitting intensity of the micro light emitting diode gradually increases with the increase of the supplied driving current, and meanwhile, the light emitting efficiency gradually increases. That is, the micro light emitting diode has low light emitting efficiency at low current density.

Therefore, it is an urgent problem to be solved in the pixel driving circuit of the micro light emitting diode to drive the micro light emitting diode to display a low gray scale.

SUMMARY

The present disclosure provides a pixel driving circuit, a pixel driving method, a display panel and a display device, which may realize full gray scale display of a micro light emitting diode.

In order to achieve the above purpose, the present disclosure adopts the following technical schemes:

In one aspect, a pixel driving circuit is provided. The pixel driving circuit includes a current control sub-circuit and a gating sub-circuit, the current control sub-circuit is coupled to a scan signal terminal, a gray scale data signal terminal, a first voltage signal terminal and an enable signal terminal; the current control sub-circuit is configured to output a gray scale current signal to an element to be driven according to a gray scale data signal from the gray scale data signal terminal under the control of a scan signal from the scan signal terminal and an enable signal from the enable signal terminal. The gating sub-circuit is coupled to the scan signal terminal, a reset signal terminal, a gating data signal terminal and a pulse voltage signal terminal; the gating sub-circuit is configured to drive the element to be driven to continuously emit light under the control of the scan signal from the scan signal terminal and a gating data signal from the gating data signal terminal, and to drive the element to be driven to intermittently emit light under the control of a reset signal from the reset signal terminal, the gating data signal from the gating data signal terminal and a pulse voltage signal from the pulse voltage signal terminal.

In some embodiments, the gating sub-circuit includes a first gating unit and a second gating unit, the first gating unit is coupled to the scan signal terminal and the gating data signal terminal; the first gating unit is configured to drive the element to be driven to continuously emit light under the control of the scan signal from the scan signal terminal and the gating data signal from the gating data signal terminal. The second gating unit is coupled to the reset signal terminal, the gating data signal terminal and the pulse voltage signal terminal; the second gating unit is configured to drive the element to be driven to intermittently emit light under the control of the reset signal from the reset signal terminal, the gating data signal from the gating data signal terminal, and the pulse voltage signal from the pulse voltage signal terminal.

In some embodiments, the first gating unit includes a first data writing sub-unit, a first storage sub-unit, and a first control sub-unit, the first data writing sub-unit being coupled to the scan signal terminal, the gating data signal terminal, and a first node; the first data writing sub-unit is configured to transmit the gating data signal from the gating data signal terminal to the first node under the control of a scan signal from the scan signal terminal. The first storage sub-unit is coupled to an initialization signal terminal and the first node; the first storage sub-unit is configured to store a voltage at the first node; the first control sub-unit is coupled to the first node; the first control sub-unit is configured to drive the element to be driven to continuously emit light under the control of the voltage at the first node.

In some embodiments, the second gating unit includes a second data writing sub-unit, a second storage sub-unit, and a second control sub-unit, the second data writing sub-unit being coupled to the reset signal terminal, the gating data signal terminal, and a second node, the second data writing sub-unit being configured to transmit the gating data signal from the gating data signal terminal to the second node under the control of the reset signal from the reset signal terminal. The second storage sub-unit is coupled to the initialization signal terminal and the second node; the second storage sub-unit is configured to store a voltage at the second node. The second control sub-unit is coupled to the second node and the pulse voltage signal terminal; the second control sub-unit is configured to drive the element to be driven to intermittently emit light under the control of the voltage at the second node and the pulse voltage signal from the pulse voltage signal terminal.

In some embodiments, the first data writing sub-unit includes a first transistor, a control electrode of the first transistor is coupled to the scan signal terminal, a first electrode of the first transistor is coupled to the gating data signal terminal, and a second electrode of the first transistor is coupled to the first node; the first storage sub-unit includes a first storage capacitor, a first terminal of the first storage capacitor is coupled to an initialization signal terminal, and a second terminal of the first storage capacitor is coupled to the first node. The first control sub-unit includes a second transistor, and a control electrode of the second transistor is coupled to the first node.

In some embodiments, a first electrode of the second transistor is coupled to the first voltage signal terminal, and a second electrode of the second transistor is coupled to the current control sub-circuit: or, a first electrode of the second transistor is coupled to the current control sub-circuit, and a second electrode of the second transistor is coupled to the element to be driven; or, a first electrode of the second transistor is coupled to the element to be driven, and a second electrode of the second transistor is coupled to a second voltage signal terminal.

In some embodiments, the second data writing sub-unit includes a third transistor, a control electrode of the third transistor is coupled to the reset signal terminal, a first electrode of the third transistor is coupled to the gating data signal terminal, and a second electrode of the third transistor is coupled to the second node. The second storage sub-unit includes a second storage capacitor, a first terminal of the second storage capacitor is coupled to an initialization signal terminal, and a second terminal of the second storage capacitor is coupled to the second node. The second control sub-unit includes a fourth transistor, a fifth transistor and a sixth transistor, a control electrode of the fourth transistor being coupled to the second node: a control electrode of the fifth transistor is coupled to the pulse voltage signal terminal, and a first electrode of the fifth transistor is coupled to a second electrode of the fourth transistor: a control electrode of the sixth transistor is coupled to the second node, and a first electrode of the sixth transistor is coupled to a second electrode of the fifth transistor.

In some embodiments, a first electrode of the fourth transistor is coupled to the first voltage signal terminal, and a second electrode of the sixth transistor is coupled to the current control sub-circuit: or, a first electrode of the fourth transistor is coupled to the current control sub-circuit, and a second electrode of the sixth transistor is coupled to the element to be driven: or, a first electrode of the fourth transistor is coupled to the element to be driven, and a second electrode of the sixth transistor is coupled to a second voltage signal terminal.

In some embodiments, the gating sub-circuit is coupled to the current control sub-circuit and the element to be driven, the element to be driven is coupled to a second voltage signal terminal.

In some embodiments, the gating sub-circuit includes a first transistor, a second transistor, a third transistor, a fourth transistor, a fifth transistor, a sixth transistor, a first storage capacitor, and a second storage capacitor: a control electrode of the first transistor is coupled to the scan signal terminal, a first electrode of the first transistor is coupled to the gating data signal terminal, and a second electrode of the first transistor is coupled to the first node: a first terminal of the first storage capacitor is coupled to an initialization signal terminal, and a second terminal of the first storage capacitor is coupled to the first node: a control electrode of the second transistor is coupled to the first node, a first electrode of the second transistor is coupled to the current control sub-circuit, and a second electrode of the second transistor is coupled to the element to be driven: a control electrode of the third transistor is coupled to the reset signal terminal, a first electrode of the third transistor is coupled to the gating data signal terminal, and a second electrode of the third transistor is coupled to the second node: a first terminal of the second storage capacitor is coupled to the initialization signal terminal, and a second terminal of the second storage capacitor is coupled to the second node: a control electrode of the fourth transistor is coupled to the second node, and a first electrode of the fourth transistor is coupled to the current control sub-circuit: a control electrode of the fifth transistor is coupled to the pulse voltage signal terminal, and a first electrode of the fifth transistor is coupled to a second electrode of the fourth transistor: a control electrode of the sixth transistor is coupled to the second node, a first electrode of the sixth transistor is coupled to a second electrode of the fifth transistor, and a second electrode of the sixth transistor is coupled to the element to be driven.

In some embodiments, the gating sub-circuit is coupled to a second voltage signal terminal and the element to be driven; the current control sub-circuit is coupled to the element to be driven.

In some embodiments, the gating sub-circuit includes a first transistor, a second transistor, a third transistor, a fourth transistor, a fifth transistor, a sixth transistor, a first storage capacitor, and a second storage capacitor: a control electrode of the first transistor is coupled to the scan signal terminal, a first electrode of the first transistor is coupled to the gating data signal terminal, and a second electrode of the first transistor is coupled to the first node: a first terminal of the first storage capacitor is coupled to the initialization signal terminal, and a second terminal of the first storage capacitor is coupled to the first node: a control electrode of the second transistor is coupled to the first node, a first electrode of the second transistor is coupled to the element to be driven, and a second electrode of the second transistor is coupled to the second voltage signal terminal: a control electrode of the third transistor is coupled to the reset signal terminal, a first electrode of the third transistor is coupled to the gating data signal terminal, and a second electrode of the third transistor is coupled to the second node: a first terminal of the second storage capacitor is coupled to the initialization signal terminal, and a second terminal of the second storage capacitor is coupled to the second node: a control electrode of the fourth transistor is coupled to the second node, and a first electrode of the fourth transistor is coupled to the element to be driven: a control electrode of the fifth transistor is coupled to the pulse voltage signal terminal, and a first electrode of the fifth transistor is coupled to a second electrode of the fourth transistor: a control electrode of the sixth transistor is coupled to the second node, a first electrode of the sixth transistor is coupled to a second electrode of the fifth transistor, and a second electrode of the sixth transistor is coupled to the second voltage signal terminal.

In some embodiments, the gating sub-circuit is coupled to the first voltage signal terminal and the current control sub-circuit; the current control sub-circuit is coupled to the element to be driven.

In some embodiments, the gating sub-circuit includes a first transistor, a second transistor, a third transistor, a fourth transistor, a fifth transistor, a sixth transistor, a first storage capacitor, and a second storage capacitor: a control electrode of the first transistor is coupled to the scan signal terminal, a first electrode of the first transistor is coupled to the gating data signal terminal, and a second electrode of the first transistor is coupled to the first node: a first terminal of the first storage capacitor is coupled to the initialization signal terminal, and a second terminal of the first storage capacitor is coupled to the first node: a control electrode of the second transistor is coupled to the first node, a first electrode of the second transistor is coupled to the first voltage signal terminal, and a second electrode of the second transistor is coupled to the current control sub-circuit: a control electrode of the third transistor is coupled to the reset signal terminal, a first electrode of the third transistor is coupled to the gating data signal terminal, and a second electrode of the third transistor is coupled to the second node: a first terminal of the second storage capacitor is coupled to the initialization signal terminal, and a second terminal of the second storage capacitor is coupled to the second node: a control electrode of the fourth transistor is coupled to the second node, and a first electrode of the fourth transistor is coupled to the first voltage signal terminal: a control electrode of the fifth transistor is coupled to the pulse voltage signal terminal, and a first electrode of the fifth transistor is coupled to a second electrode of the fourth transistor: a control electrode of the sixth transistor is coupled to the second node, a first electrode of the sixth transistor is coupled to a second electrode of the fifth transistor, and a second electrode of the sixth transistor is coupled to the current control sub-circuit.

In some embodiments, the current control sub-circuit includes a data writing unit, a driving unit, a compensation unit, a storage unit, a light emitting control unit, and a reset unit. The data writing unit is coupled to the scan signal terminal, the gray scale data signal terminal and a third node; the data writing unit is configured to transmit a gray scale data signal received at the gray scale data signal terminal to the third node under the control of the scan signal from the scan signal terminal. The driving unit is coupled to the third node, the fourth node and the fifth node; the driving unit is configured to be turned on under the control of the voltage at the fifth node. The compensation unit is coupled to the scan signal terminal, the fourth node, and the fifth node; the compensation unit is configured to compensate the voltage at the fifth node under the control of the scan signal from the scan signal terminal, so that the voltage at the fifth node is related to a threshold voltage of the driving unit. The storage unit is coupled to the fifth node and the first voltage signal terminal; the storage unit is configured to store a voltage at the fifth node. The light emitting control unit is coupled to the enable signal terminal, the third node, and the fourth node; the light emitting control unit is configured to transmit the gray scale current signal to the element to be driven in cooperation with the driving unit under the control of the enable signal from the enable signal terminal. The reset unit is coupled to the reset signal terminal, an initialization signal terminal and the fifth node; the reset unit is configured to transmit an initialization signal from the initialization signal terminal to the fifth node under the control of the reset signal from the reset signal terminal.

In some embodiments, the light emitting control unit is coupled to the first voltage signal terminal and the gating sub-circuit: or, the light emitting control unit is coupled to the first voltage signal terminal and the element to be driven: or, the light emitting control unit is coupled to the gating sub-circuit and the element to be driven.

In some embodiments, the data writing unit includes a seventh transistor, a control electrode of the seventh transistor is coupled to the scan signal terminal, a first electrode of the seventh transistor is coupled to the gray scale data signal terminal, and a second electrode of the seventh transistor is coupled to the third node. The driving unit includes an eighth transistor, a control electrode of the eighth transistor is coupled to the fifth node, a first electrode of the eighth transistor is coupled to the third node, and a second electrode of the eighth transistor is coupled to the fourth node. The compensation unit includes a ninth transistor, a control electrode of the ninth transistor is coupled to the scan signal terminal, a first electrode of the ninth transistor is coupled to the fourth node, and a second electrode of the ninth transistor is coupled to the fifth node. The storage unit includes a third storage capacitor, a first terminal of the third storage capacitor is coupled to the first voltage signal terminal, and a second terminal of the third storage capacitor is coupled to the fifth node. The light emitting control unit includes a tenth transistor and an eleventh transistor, a control electrode of the tenth transistor is coupled to the enable signal terminal, and a second electrode of the tenth transistor is coupled to the third node: a control electrode of the eleventh transistor is coupled to the enable signal terminal, a first electrode of the eleventh transistor is coupled to the fourth node, wherein, a first electrode of the tenth transistor is coupled to the first voltage signal terminal, and a second electrode of the eleventh transistor is coupled to the gating sub-circuit: or, a first electrode of the tenth transistor is coupled to the first voltage signal terminal, and a second electrode of the eleventh transistor is coupled to the element to be driven: or, a first electrode of the tenth transistor is coupled to the gating sub-circuit, and a second electrode of the eleventh transistor is coupled to the element to be driven. The reset unit includes a twelfth transistor, a control electrode of the twelfth transistor is coupled to the reset signal terminal, a first electrode of the twelfth transistor is coupled to the initialization signal terminal, and a second electrode of the twelfth transistor is coupled to the fifth node.

The pixel driving circuit provided by the present disclosure includes a current control sub-circuit and a gating sub-circuit. The current control sub-circuit is configured to output a gray scale current signal to the element to be driven. The gating sub-circuit is configured to drive the element to be driven to continuously emit light under the control of a scan signal from the scan signal terminal and a gating data signal from the gating data signal terminal, and to drive the element to be driven to intermittently emit light under the control of a reset signal from the reset signal terminal, a gating data signal from the gating data signal terminal, and a pulse voltage signal from the pulse voltage signal terminal. The magnitude of the gray scale current signal is related to the first voltage signal and the gray scale data signal, and the total duration of intermittent light emission of the element to be driven is related to the pulse voltage signal.

In this way, when the gating sub-circuit drives the element to be driven to continuously emit light, the current control sub-circuit may control the magnitude of the light emitting intensity of the element to be driven by controlling the magnitude of the gray scale data signal, thereby realizing high gray scale display. When the gating sub-circuit drives the element to be driven to intermittently emit light, the control of the magnitude of the light emitting intensity of the element to be driven may be realized by controlling the magnitude of the gray scale data signal, and the light emission duration of the element to be driven is shortened by the pulse voltage signal, thereby realizing low gray scale display. That is to say; with the pixel driving circuit, when realizing the display of higher gray scale, the light emitting luminance of the element to be driven in one frame may be changed by controlling the magnitude of the gray scale data signal: when realizing the display of lower gray scale, the light emitting luminance of the element to be driven in one frame may be changed by shortening the light emitting duration of the element to be driven at high current density.

As can be seen from the above, with the pixel driving circuit, full gray scale display of the element to be driven may be realized at high current density.

In another aspect, a pixel driving method is provided. The pixel driving method is applied to the pixel driving circuit described in any one of the above embodiments, and the gating sub-circuit of the pixel driving circuit includes a first gating unit and a second gating unit: one frame period includes a reset phase, a scan phase, and a light emitting phase; the pixel driving method includes: in the case where the display luminance is required to be a high gray scale, during the reset phase, the second gating unit writes the turn-off voltage of the gating data signal from the gating data signal terminal under the control of the reset signal from the reset signal terminal; during the scan phase, the first gating unit writes the turn-on voltage of the gating data signal from the gating data signal terminal under the control of the scan signal from the scan signal terminal; during the light emitting phase, the first gating unit drives the element to be driven to continuously emit light in cooperation with the current control sub-circuit of the pixel driving circuit under the control of the turn-on voltage of the gating data signal, in the case where the display luminance is required to be a low gray scale, during the reset phase, the second gating unit writes the turn-on voltage of the gating data signal from the gating data signal terminal under the control of the reset signal from the reset signal terminal; during the scan phase, the first gating unit writes the turn-off voltage of the gating data signal from the gating data signal terminal under the control of the scan signal from the scan signal terminal; during the light emitting phase, the second gating unit drives the element to be driven to intermittently emit light in cooperation with the current control sub-circuit under the control of the turn-on voltage of the gating data signal and the pulse voltage signal from the pulse voltage signal terminal.

Compared with the prior art, the pixel driving method provided by the present disclosure has the same beneficial effects as those of the pixel driving circuit provided by the above technical scheme, and details are not repeated here.

In yet another aspect, a display panel is provided. The display panel includes the pixel driving circuit and the element to be driven described in any one of the above embodiments, and the element to be driven is coupled to the pixel driving circuit.

Compared with the prior art, the beneficial effects of the display panel provided by the present disclosure are the same as the beneficial effects of the pixel driving circuit provided by the above technical scheme, and are not described here again.

In yet another aspect, a display device is provided. The display device includes the above display panel.

Compared with the prior art, the beneficial effects of the display device provided by the present disclosure are the same as the beneficial effects of the pixel driving circuit provided by the above technical scheme, and are not described herein again.

BRIEF DESCRIPTION OF DRAWINGS

In order to more clearly illustrate the technical schemes of the present disclosure, the drawings required in some embodiments of the present disclosure will be briefly described below: It is apparent that the drawings in the following description are only drawings of some embodiments of the present disclosure: and other drawings may be obtained by one of ordinary skill in the art based on these drawings. Furthermore, the drawings in the following description may be considered as schematic diagrams, and do not limit an actual size of products, an actual flow of methods, an actual timing of signals, and the like involved in the embodiments of the present disclosure.

DETAIL DESCRIPTION OF EMBODIMENTS

Figure 1:
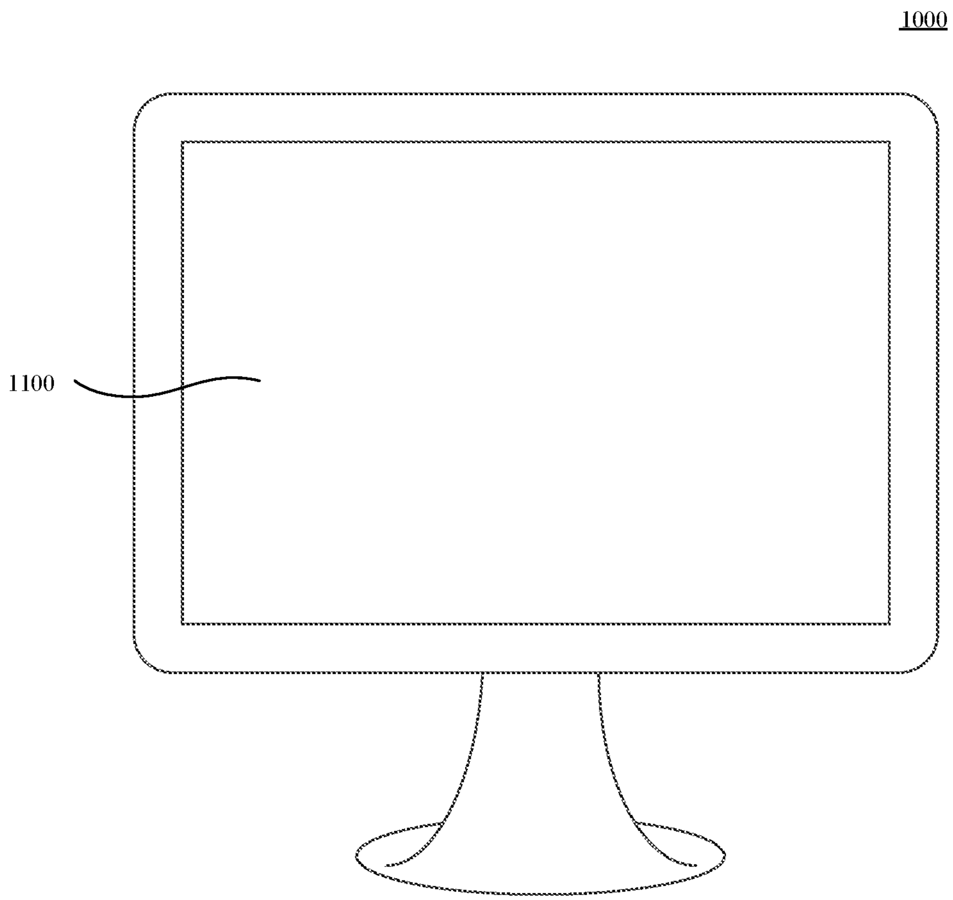
FIG. 1 is a structural diagram of a display device according to some embodiments.

The technical schemes in some embodiments of the present disclosure will be clearly and completely described below with reference to the accompanying drawings. It is to be understood that the described embodiments are only a part of the embodiments of the present disclosure, and not all of the embodiments. All other embodiments, which are obtained by one of ordinary skill in the art based on the embodiments provided in the present disclosure, are within the scope of protection of the present disclosure.

Unless the context requires otherwise, throughout the specification and the claims, the term "comprise" and its other forms such as "comprises" in a third person singular form and "comprising" in a present participle form, will be interpreted as an open, inclusive meaning, i.e., as "including, but not limited to". In the description of the specification, the terms "one embodiment", "some embodiments", "exemplary embodiments", "example", "specific example" or "some examples" and the like are intended to indicate that a particular feature, structure, material, or characteristic in connection with the embodiment or example is included in at least one embodiment or example of the present disclosure. The schematic representations of the above terms do not necessarily refer to a same embodiment or example. Furthermore, the particular features, structures, materials, or characteristics may be included in any of one or more embodiments or examples in any suitable manner.

In the following, the terms "first", "second" and the like are used for descriptive purposes only and are not to be understood as indicating or implying relative importance or implicitly indicating the number of technical features indicated. Thus, a feature defined by "first" or "second" may explicitly or implicitly include one or more of that feature. In the description of the embodiments of the present disclosure, "a plurality" means two or more unless otherwise specified.

Transistors used in a pixel driving circuit provided in the embodiments of the present disclosure may be Thin Film Transistors (TFTs), field effect transistors (metal oxide semiconductor, MOS), or other switching devices with the same characteristics. Thin film transistors are described as an example in the embodiments of the present disclosure.

A control electrode of each thin film transistor adopted by the pixel driving circuit is a gate electrode of a transistor, a first electrode is one of a source electrode and a drain electrode of the thin film transistor, and a second electrode is the other of the source electrode and the drain electrode of the thin film transistor. Since the source and drain electrodes of the thin film transistor may be symmetrical in structure, the source and drain electrodes may be no difference in structure, that is, the first and second electrodes of the thin film transistor in the embodiment of the present disclosure may be no difference in structure. For example, in the case where the thin film transistor is a P-type transistor, the first electrode of the thin film transistor is a source electrode, and the second electrode is a drain electrode: for example, in the case where the thin film transistor is an N-type transistor, the first electrode of the transistor is a drain electrode and the second electrode is a source electrode.

In addition, in the pixel driving circuits provided in embodiments of the present disclosure, as an example, the thin film transistor is described as a P-type transistor. It should be noted that the embodiments of the present disclosure include, but are not limited to, the above example. For example, one or more thin film transistors in the pixel driving circuit provided by the embodiment of the present disclosure may also be N-type transistors, and it is only necessary to couple electrodes of the selected type of thin film transistors correspondingly with reference to electrodes of the corresponding thin film transistors in the embodiment of the present disclosure, and enable corresponding voltage terminals to provide a corresponding high level voltage or low level voltage.

In the pixel driving circuit provided by the embodiment of the present disclosure, a capacitor may be a capacitor device separately manufactured by a process. For example, the capacitor device is realized by manufacturing specialized capacitor electrodes, and each capacitor electrode of the capacitor may be realized by a metal layer, a semiconductor layer (for example, doped poly-silicon), and the like. The capacitor may also be a parasitic capacitor between the transistors, or realized by the transistors themselves and other devices and lines, or realized by using the parasitic capacitance between lines of the circuit itself.

In the pixel driving circuit provided by the embodiment of the present disclosure, a first node, a second node, and the like do not represent actually existing components, but represent junctions of relevant electrical connections in the circuit diagram, that is, the nodes are equivalent to the junctions of relevant electrical connections in the circuit diagram.

With the progress of display technology, the technology of semiconductor devices, which are the core of display devices, has been greatly advanced. As a current type light emitting device, Light Emitting Diodes (LEDs) are increasingly used in high performance display devices due to their characteristics of self-luminescence, fast response, and wide viewing angle.

The Micro Light Emitting Diode (Micro LED) display device has high luminance and wide color gamut, may meet the requirements of High-Dynamic Range (HDR) image technology on the luminance and the color gamut of the display device, and is more suitable for realizing HDR display.

Figure 3:
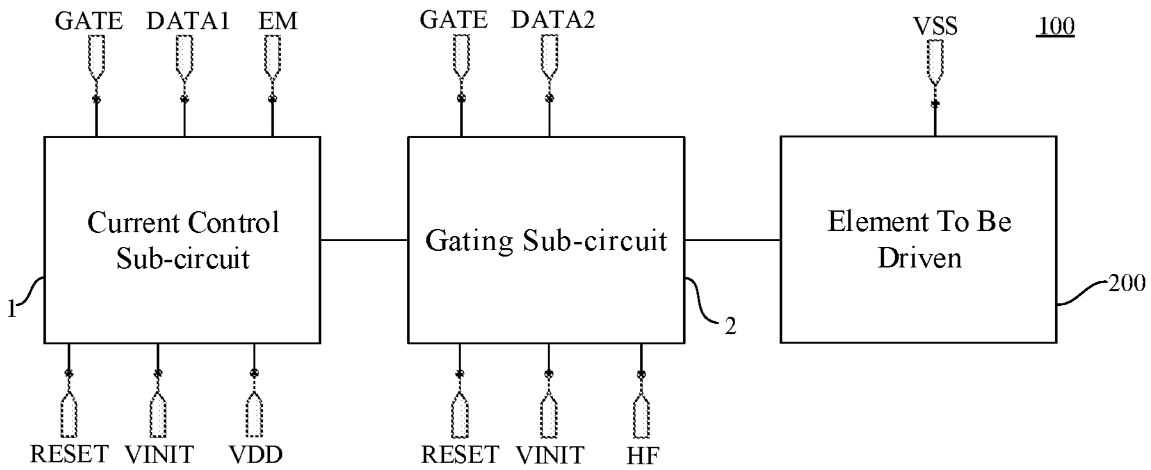
FIG. 3 is a block diagram of a structure of a pixel driving circuit according to some embodiments.

Some embodiments of the present disclosure provide a pixel driving circuit 100. As shown in FIG. 3, the pixel driving circuit 100 includes: a current control sub-circuit 1 and a gating sub-circuit 2.

The current control sub-circuit 1 is coupled to a scan signal terminal GATE, a gray scale data signal terminal DATA1, a first voltage signal terminal VDD, and an enable signal terminal EM. The current control sub-circuit is configured to output a gray scale current signal to an element to be driven 200, according to a gray scale data signal Data1 from the gray scale data signal terminal DATA1, under the control of a scan signal Gate from the scan signal terminal GATE and an enable signal Em from the enable signal terminal EM.

The gating sub-circuit 2 is coupled to the scan signal terminal GATE, a reset signal terminal RESET, a gating data signal terminal DATA2, and a pulse voltage signal terminal HF. The gating sub-circuit 2 is configured to drive the element to be driven 200 to continuously emit light, under the control of a scan signal Gate from the scan signal terminal GATE and a gating data signal Data2 from the gating data signal terminal DATA2; and to drive the element to be driven 200 to intermittently emit light, under the control of the reset signal Reset from the reset signal terminal RESET, the gating data signal Data2 from the gating data signal terminal DATA2 and a pulse voltage signal Hf from the pulse voltage signal terminal HF.

The magnitude of the gray scale current signal is related to the first voltage signal Vdd and the gray scale data signal Data1, and the total duration of the intermittent light emission of the element to be driven 200 is related to the pulse voltage signal Hf.

In this way, when the gating sub-circuit 2 drives the element to be driven 200 to continuously emit light, the current control sub-circuit 1 may control the magnitude of the light emitting intensity of the element to be driven 200 by controlling the magnitude of the gray scale data signal Data1, thereby realizing high gray scale display. When the gating sub-circuit 2 drives the element to be driven 200 to intermittently emit light, the control of the magnitude of the light emitting intensity of the element to be driven 200 may be realized by controlling the magnitude of the gray scale data signal Data1, and the light emission duration of the element to be driven 200 is shortened by the pulse voltage signal Hf, thereby realizing low gray scale display.

That is to say; with the pixel driving circuit 100, when realizing the display of higher gray scale, the light emitting luminance of the element to be driven 200 in one frame may be changed by controlling the magnitude of the gray scale data signal Data1: when realizing the display of lower gray scale, the light emitting luminance of the element to be driven 200 in one frame may be changed by shortening the light emitting duration of the element to be driven 200 at high current density.

As can be seen from the above, with the pixel driving circuit 100, full gray scale display of the element to be driven 200 may be realized at high current density, and the light emitting efficiency is high, the energy consumption is lower, and the cost is saved.

If a frequency of the pulse voltage signal is too low; the flicker is easily perceived by human eyes, influencing the appearance: if the frequency of the pulse voltage signal is too high, hardware, such as an IC, is difficult to implement the high frequency. Based on this, in some embodiments, a frequency range of the pulse voltage signal is 3000 Hz to 60000 Hz, and the flicker of the element to be driven 200 is not perceived by human eyes and it is easy to implement the high frequency. For example, the frequency of the pulse voltage signal may be 3000 Hz, 10000 Hz, 60000 Hz, and so on.

For example, for all circuits included in the display panel, the frequency of the pulse voltage signal is constant, and is always a preset frequency or fluctuates in a small range near the preset frequency.

In some embodiments, the element to be driven 200 is a light emitting device such as a Micro LED, and the current control sub-circuit 1 controls the magnitude of the gray scale data signal Data1, so as to control the magnitude of the gray scale current signal transmitted to the light emitting device, thereby directly controlling the light emitting intensity of the light emitting device; the gating sub-circuit 2 shortens the working time of the light emitting device by shortening a duration for transmitting the gray scale current signal to the light emitting device, thereby indirectly reducing the light emitting luminance of the light emitting device in one frame.

Figure 4:
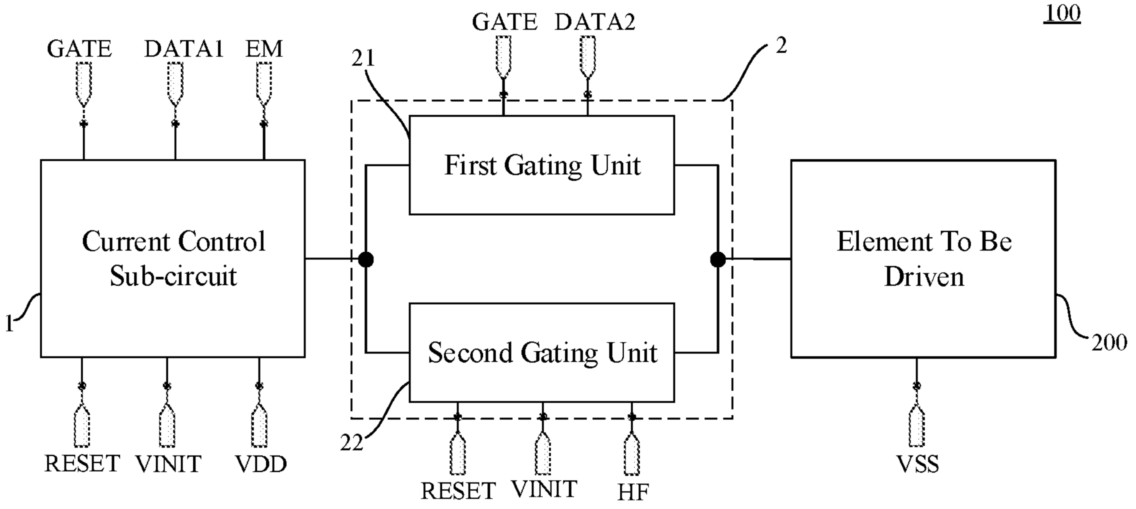
FIG. 4 is a block diagram of a structure of another pixel driving circuit according to some embodiments.

In some embodiments, as shown in FIG. 4, the gating sub-circuit 2 includes a first gating unit 21 and a second gating unit 22.

The first gating unit 21 is coupled to the scan signal terminal GATE and the gating data signal terminal DATA2. The first gating unit 21 is configured to drive the element to be driven 200 to continuously emit light, under the control of the scan signal Gate from the scan signal terminal GATE and the gating data signal Data2 from the gating data signal terminal DATA2.

The second gating unit 22 is coupled to the reset signal terminal RESET, the gating data signal terminal DATA2, and the pulse voltage signal terminal HF; the second gating unit 22 is configured to drive the element to be driven 200 to intermittently emit light, under the control of a reset signal Reset from the reset signal terminal RESET, a gating data signal Data2 from the gating data signal terminal DATA2, and a pulse voltage signal Hf from the pulse voltage signal terminal HF.

In the gating sub-circuit 2, the first gating unit 21 receives the scan signal Gate and the gating data signal Data2, and drives the element to be driven 200 to continuously emit light; the second gating unit 22 receives the reset signal Reset, the gating data signal Data2, and the pulse voltage signal Hf, and drives the element to be driven 200 to intermittently emit light.

Figure 5:
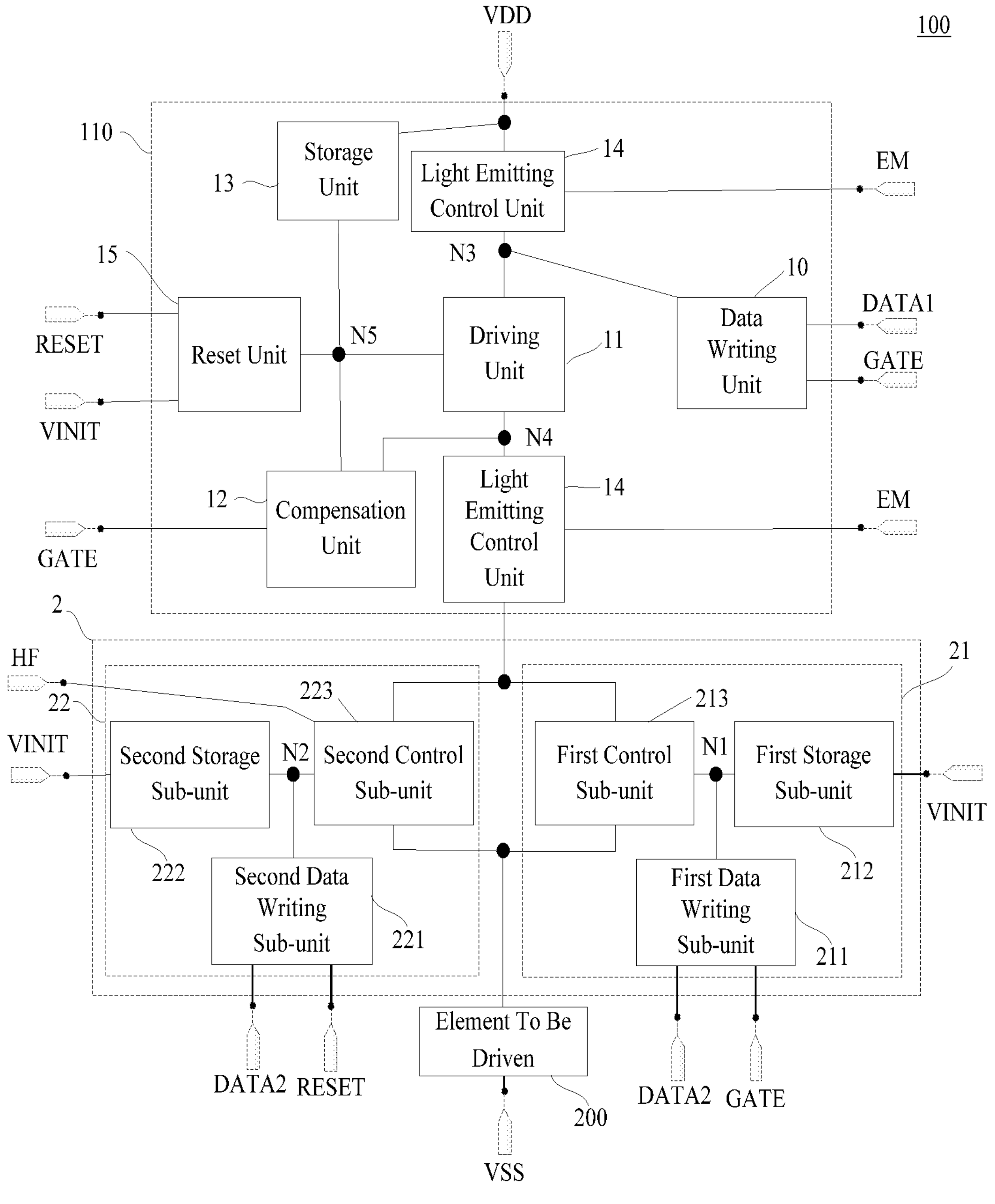
FIG. 5 is a structural diagram of a pixel driving circuit according to some embodiments.
Figure 6:
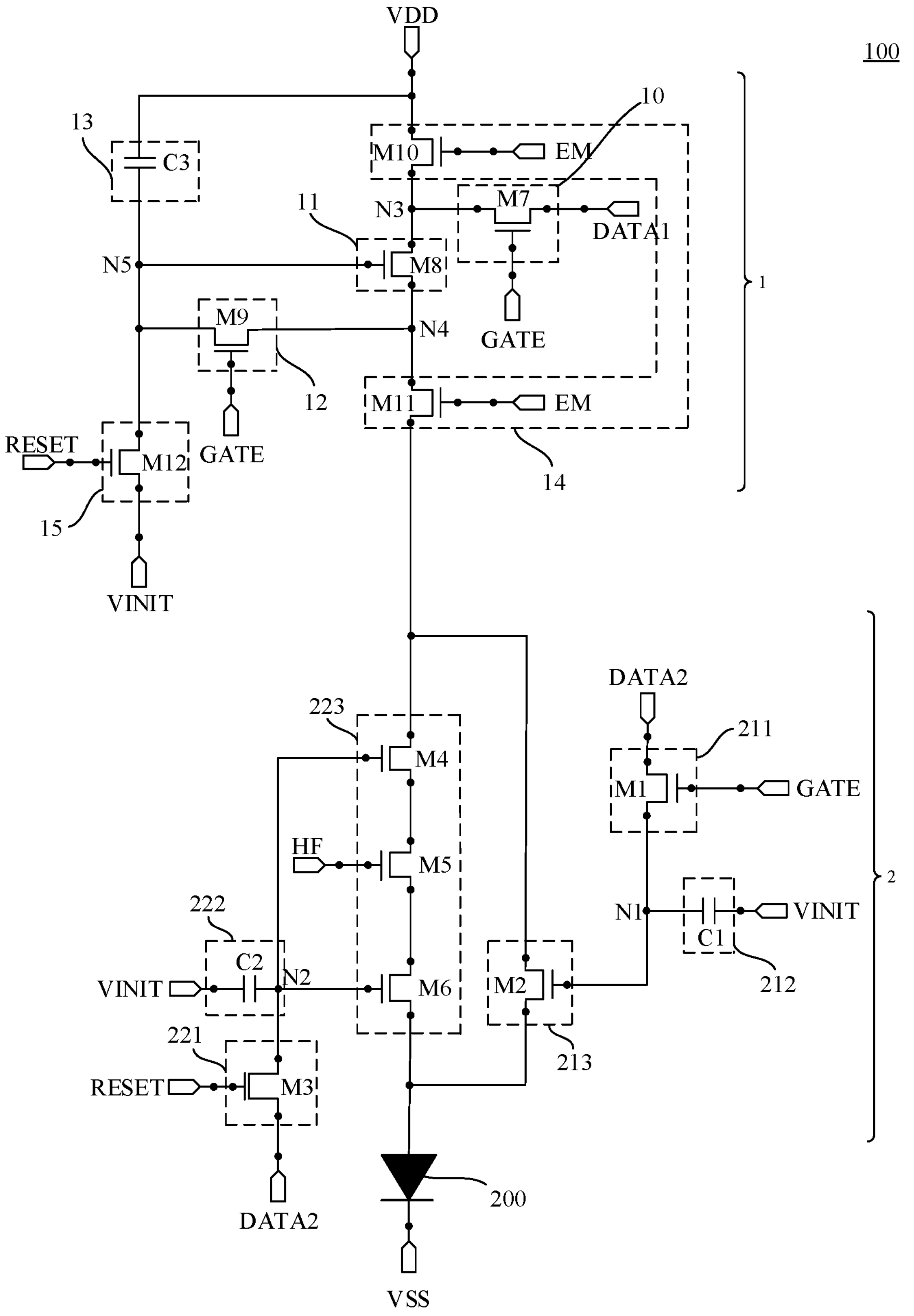
FIG. 6 is a structural diagram of another pixel driving circuit according to some embodiments.
Figure 7:
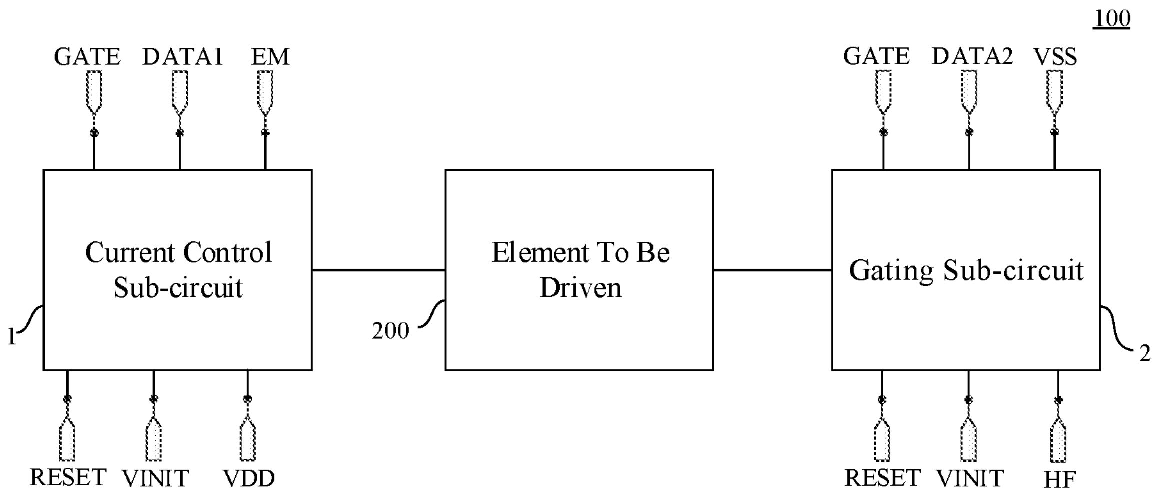
FIG. 7 is a block diagram of a structure of yet another pixel driving circuit according to some embodiments.
Figure 8:
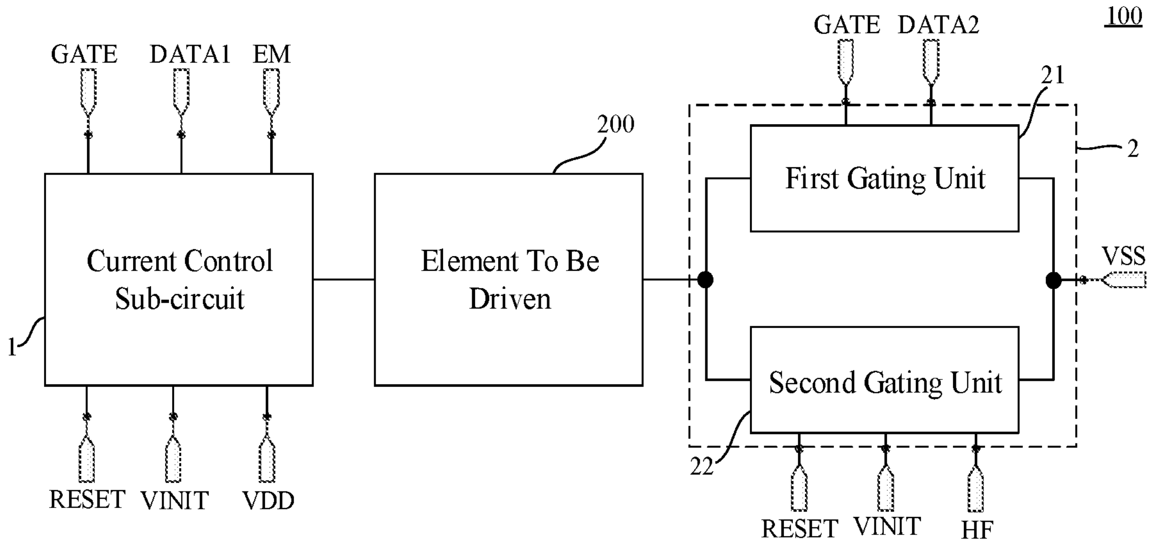
FIG. 8 is a block diagram of a structure of still another pixel driving circuit according to some embodiments.
Figure 9:
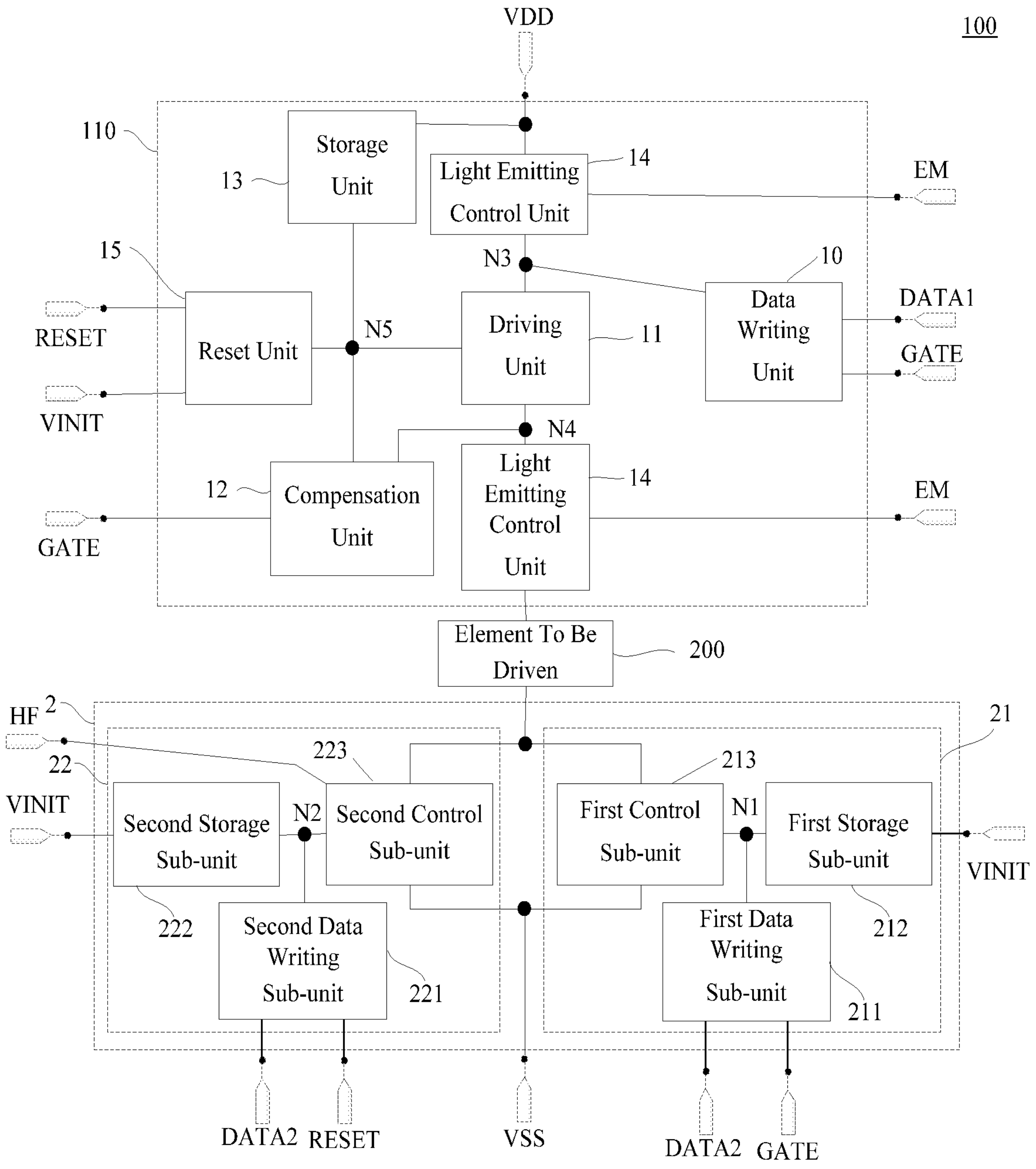
FIG. 9 is a structural diagram of yet another pixel driving circuit according to some embodiments.

On this basis, as shown in FIGS. 5 and 6, the first gating unit 21 includes: a first data writing sub-unit 211, a first storage sub-unit 212, and a first control sub-unit 213.

The first data writing sub-unit 211 is coupled to the scan signal terminal GATE, the gating data signal terminal DATA2 and a node N1. The first data writing sub-unit 21 is configured to transmit a gating data signal Data2 from the gating data signal terminal DATA2 to the first node N1, under the control of a scan signal Gate from the scan signal terminal GATE.

The first storage sub-unit 212 is coupled to an initialization signal terminal VINIT and the first node N1; the first storage sub-unit 212 is configured to store the voltage at the first node N1.

The first control sub-unit 213 is coupled to the first node N1. The first control sub-unit 213 is configured to drive the element to be driven 200 to continuously emit light under the control of the voltage at the first node N1.

As can be seen from the above, in the first gating unit 21, the first control sub-unit 213 is controlled by a voltage formed by the gating data signal Data2 transmitted by the first data writing sub-unit 211 to the first node N1, to drive the element to be driven 200 to continuously emit light.

As shown in FIGS. 5 and 6, the second gating unit 22 includes: a second data writing sub-unit 221, a second storage sub-unit 222, and a second control sub-unit 223.

The second data writing sub-unit 221 is coupled to the reset signal terminal RESET, the gating data signal terminal DATA2, and a second node N2. The second data writing sub-unit 221 is configured to transmit a gating data signal Data2 from the gating data signal terminal DATA2 to the second node N2 under the control of a reset signal Reset from the reset signal terminal RESET.

The second storage sub-unit 222 is coupled to the initialization signal terminal VINIT and the second node N2; the second storage sub-unit 222 is configured to store the voltage at the second node N2.

The second control sub-unit 223 is coupled to the second node N2 and the pulse voltage signal terminal HF. The second control sub-unit 223 is configured to drive the element to be driven 200 to intermittently emit light under the control of the voltage at the second node N2 and the pulse voltage signal Hf from the pulse voltage signal terminal HF.

As can be seen from the above, in the above-mentioned second gating unit 22, the second control sub-unit 223 is controlled by a voltage formed by the gating data signal Data2 transmitted by the second data writing sub-unit 221 to the second node N2, and by the pulse voltage signal Hf of the pulse voltage signal terminal HF received by the second control sub-unit 223, to drive the element to be driven 200 to intermittently emit light.

For example, as shown in FIG. 6, the first data writing sub-unit 211 includes a first transistor M1, a control electrode of the first transistor M1 is coupled to the scan signal terminal GATE, a first electrode of the first transistor M1 is coupled to the gating data signal terminal DATA2, and a second electrode of the first transistor M1 is coupled to the first node N1. The first transistor M1 is configured to be turned on under the control of a scan signal Gate from the scan signal terminal GATE, and transmit the gating data signal Data2 of the gating data signal terminal DATA2 to the first node N1.

The first storage sub-unit 212 includes a first storage capacitor C1, a first terminal of the first storage capacitor C1 is coupled to the initialization signal terminal VINIT, and a second terminal of the first storage capacitor C1 is coupled to the first node N1. The first storage capacitor C1 is configured to receive the gating data signal Data2 at the first node N1 and store the gating data signal Data2.

Figure 10:
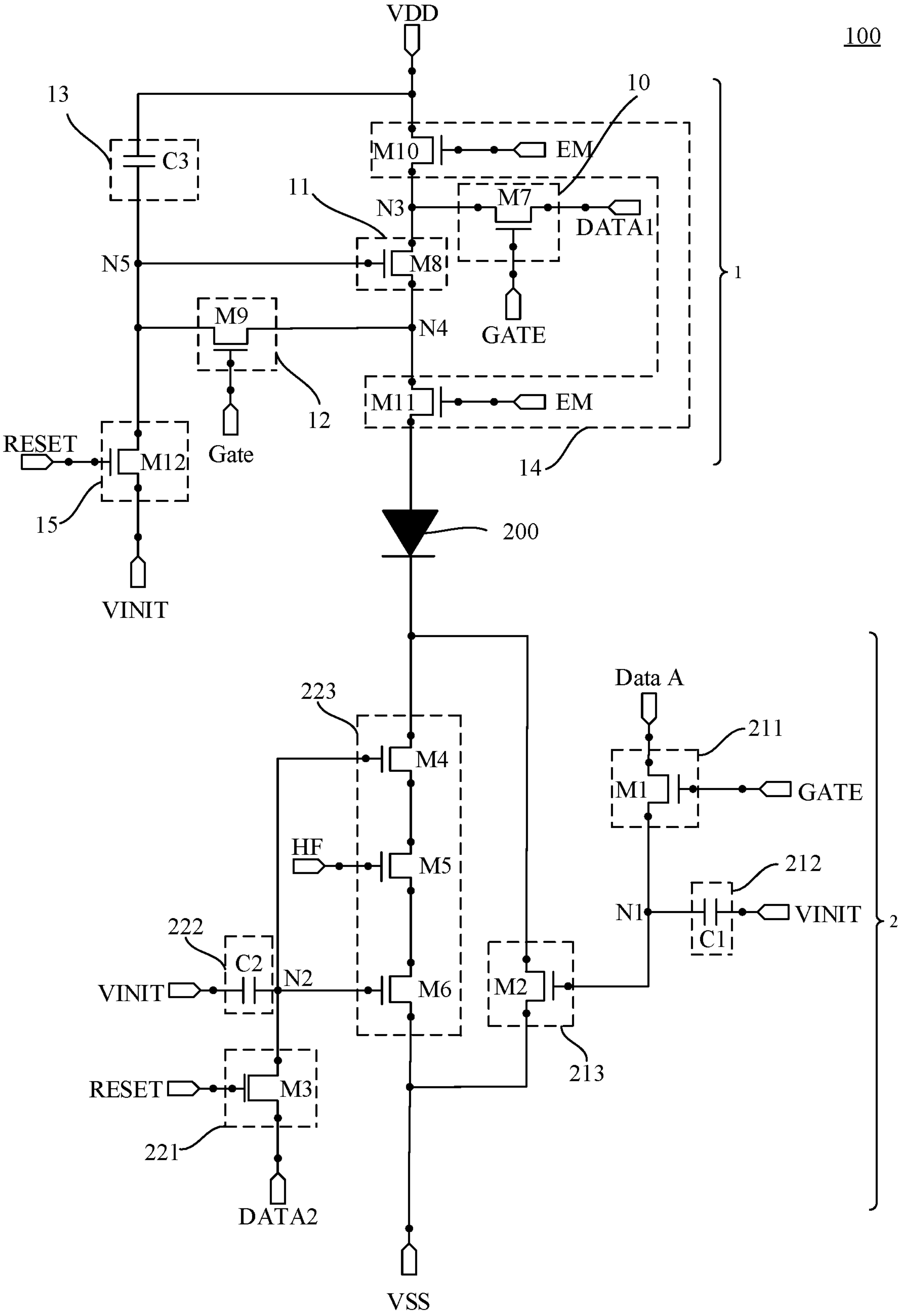
FIG. 10 is a structural diagram of still another pixel driving circuit according to some embodiments.
Figure 11:
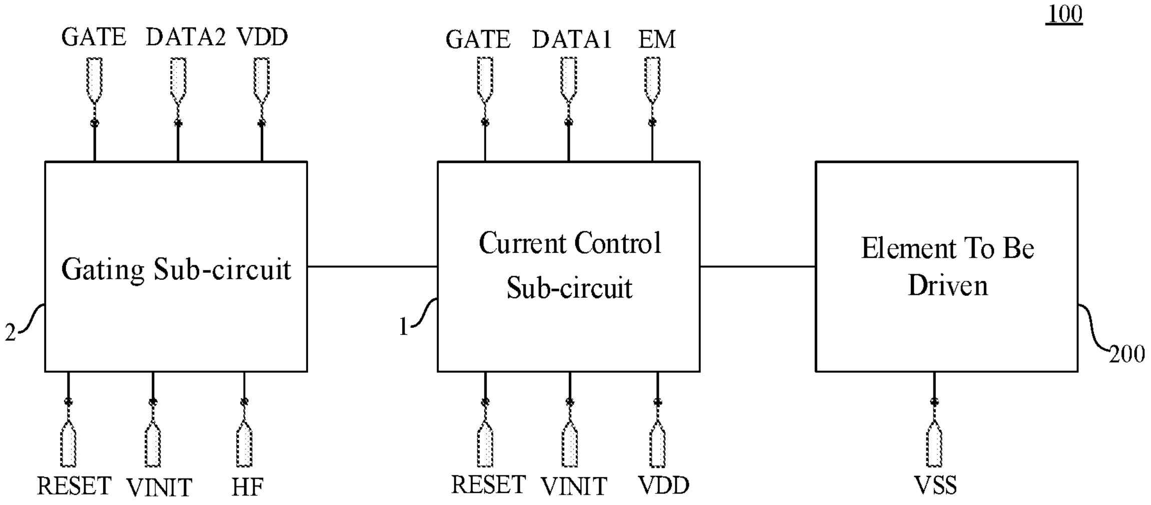
FIG. 11 is a block diagram of a structure of yet another pixel driving circuit according to some embodiments.
Figure 12:
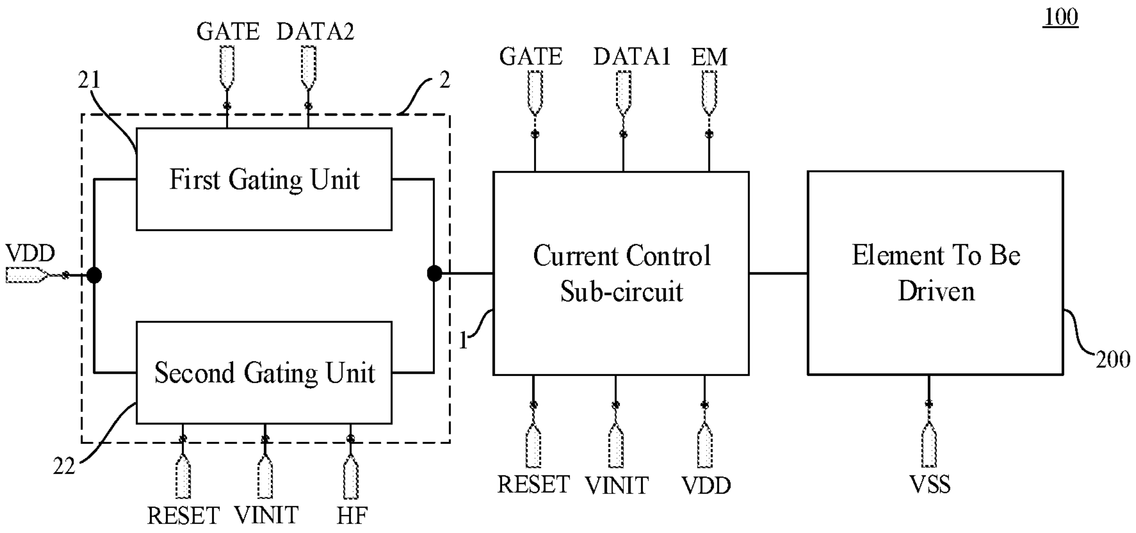
FIG. 12 is a block diagram of a structure of still another pixel driving circuit according to some embodiments.
Figure 13:
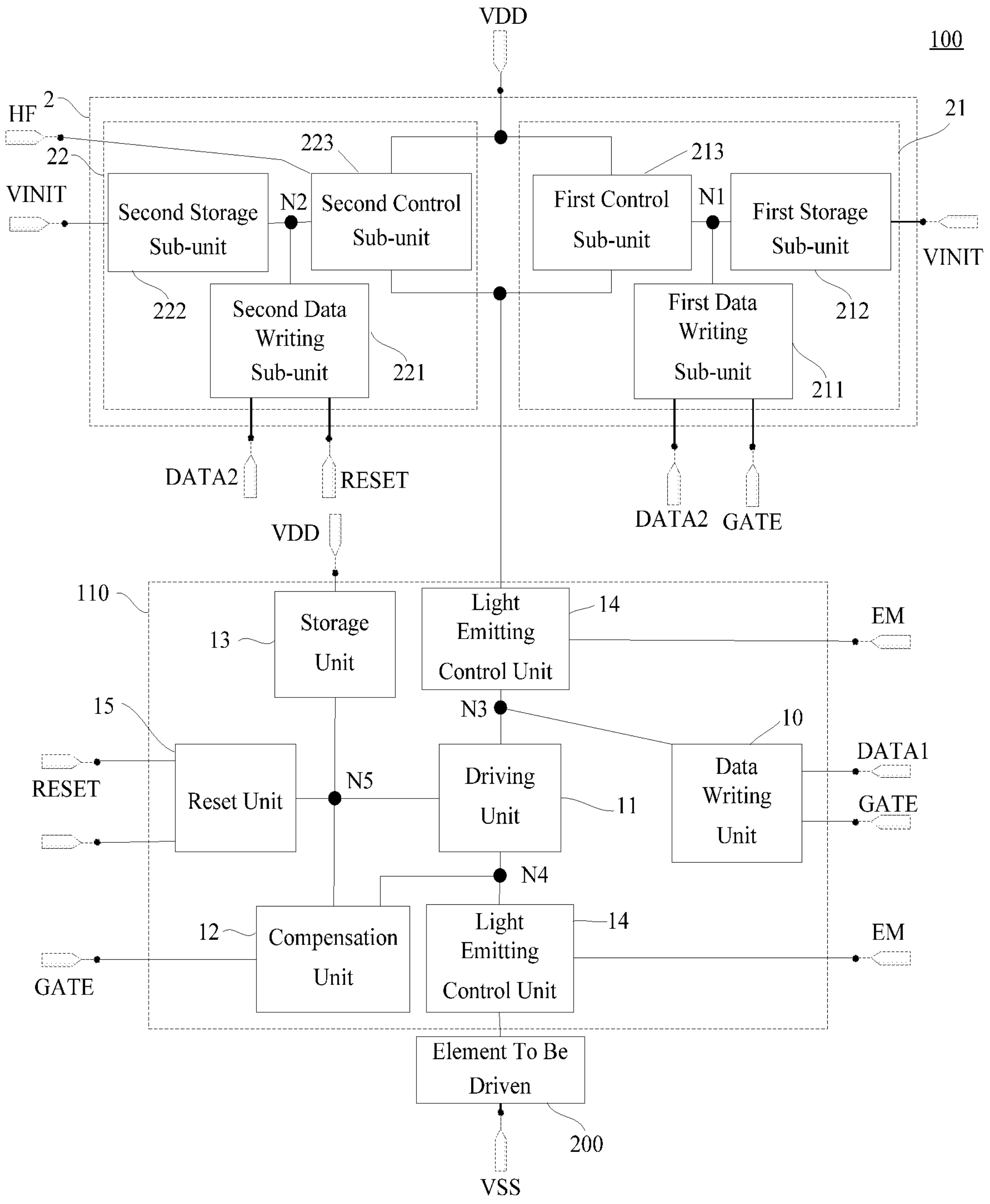
FIG. 13 is a structural diagram of yet another pixel driving circuit according to some embodiments.
Figure 14:
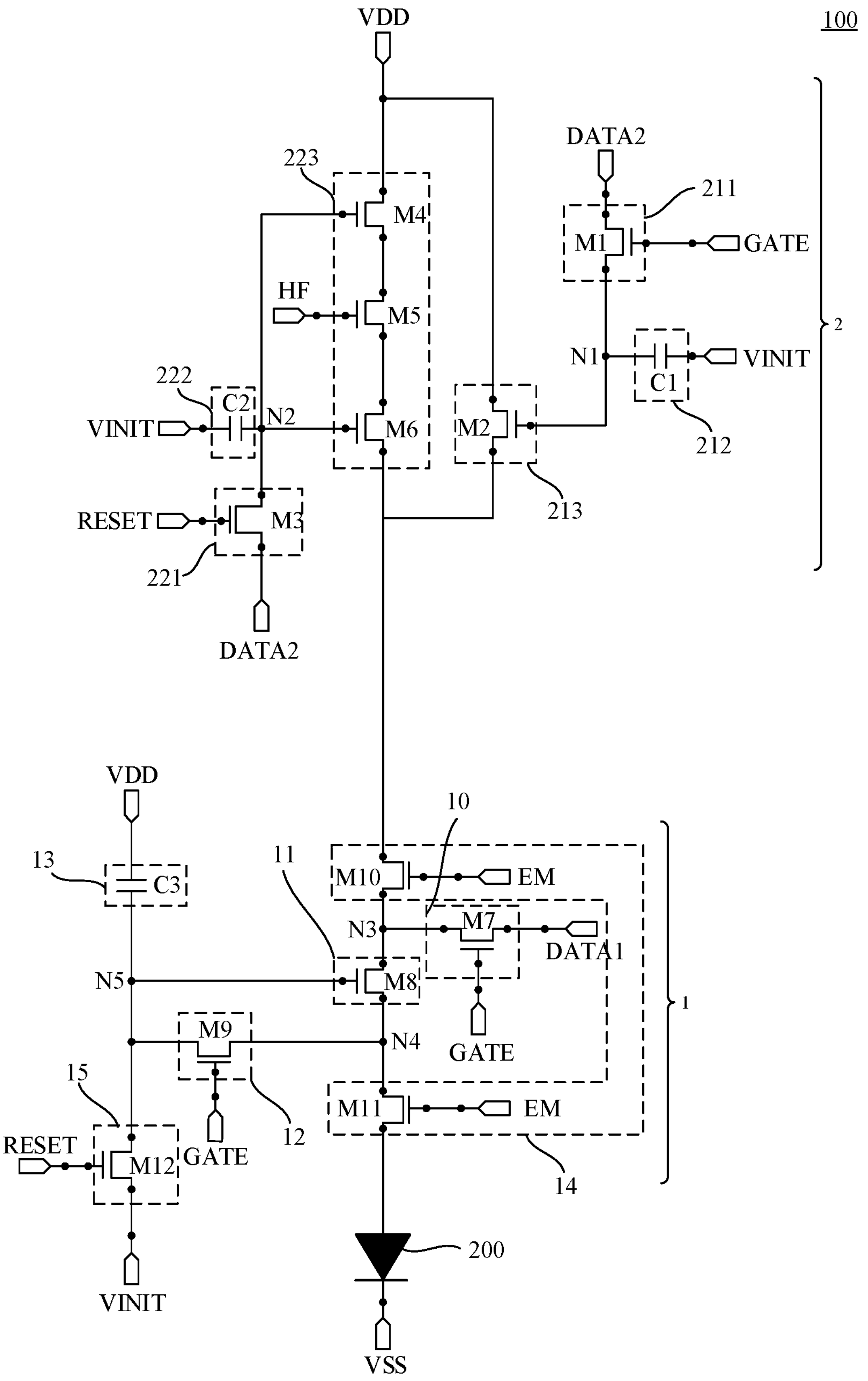
FIG. 14 is a structural diagram of still another pixel driving circuit according to some embodiments.

As shown in FIGS. 6, 10 and 14, the first control sub-unit 213 includes a second transistor M2, and a control electrode of the second transistor M2 is coupled to the first node N1; a first electrode of the second transistor M2 is coupled to the first voltage signal terminal VDD, and a second electrode of the second transistor M2 is coupled to the current control sub-circuit 1 (see FIG. 14); or, a first electrode of the second transistor M2 is coupled to the current control sub-circuit 1, and a second electrode of the second transistor M2 is coupled to the element to be driven 200 (see FIG. 6); or, a first electrode of the second transistor M2 is coupled to the element to be driven 200, and a second electrode of the second transistor M2 is coupled to the second voltage signal terminal VSS (see FIG. 10). The second transistor M2 is configured to be turned on under the control of the voltage at the first node N1, to drive the element to be driven 200 to continuously emit light.

For example, as shown in FIG. 6, the second data writing sub-unit 221 includes a third transistor M3.

A control electrode of the third transistor M3 is coupled to the reset signal terminal RESET, a first electrode of the third transistor M3 is coupled to the gating data signal terminal DATA2, and a second electrode of the third transistor M3 is coupled to the second node N2. The third transistor M3 is configured to be turned on under the control of a reset signal Reset from the reset signal terminal RESET, and transmit the gating data signal Data2 of the gating data signal terminal DATA2 to the second node N2.

The second storage sub-unit 222 includes a second storage capacitor C2, a first terminal of the second storage capacitor C2 is coupled to the initialization signal terminal VINIT, and a second terminal of the second storage capacitor C2 is coupled to the second node N2. The second storage capacitor C2 is configured to receive the gating data signal Data2 at the second node N2 and store the gating data signal Data2.

The second control sub-unit 223 includes: a fourth transistor M4, a fifth transistor M5, and a sixth transistor M6.

A control electrode of the fourth transistor M4 is coupled to the second node N2. The fourth transistor M4 is configured to be turned on under the control of the voltage at the second node N2.

A control electrode of the fifth transistor M5 is coupled to the pulse voltage signal terminal HF, and a first electrode of the fifth transistor M5 is coupled to a second electrode of the fourth transistor M4. The fifth transistor M5 is configured to be intermittently turned on under the control of the pulse voltage signal Hf of the pulse voltage signal terminal HF.

A control electrode of the sixth transistor M6 is coupled to the second node N2, and a first electrode of the sixth transistor M6 is coupled to a second electrode of the fifth transistor M5. The sixth transistor M6 is configured to be turned on under the control of the voltage at the second node N2.

As shown in FIGS. 6, 10, and 14, a first electrode of the fourth transistor is coupled to the first voltage signal terminal VDD, and a second electrode of the sixth transistor is coupled to the current control sub-circuit (see FIG. 14); or, a first electrode of the fourth transistor is coupled to the current control sub-circuit, and a second electrode of the sixth transistor is coupled to the element to be driven (see FIG. 6); or, a first electrode of the fourth transistor is coupled to the element to be driven, and a second electrode of the sixth transistor is coupled to the second voltage signal terminal VSS (see FIG. 10). The fourth transistor M4 and the sixth transistor M6 are both configured to be turned on under the control of the voltage at the second node N2, and the fifth transistor M5 is configured to be intermittently turned on under the control of the pulse voltage signal Hf of the pulse voltage signal terminal HF, so as to drive the element to be driven 200 to intermittently emit light.

In some embodiments, as shown in FIG. 3 to FIG. 6, the gating sub-circuit 2 is coupled to the current control sub-circuit 1 and the element to be driven 200; the element to be driven 200 is coupled to the second voltage signal terminal VSS.

On this basis, the specific circuit structure of the gating sub-circuit 2 included in the pixel driving circuit 100 provided in the embodiment of the present disclosure is described below as a whole and as an example.

As shown in FIG. 6, the gating sub-circuit 2 includes: a first transistor M1, a second transistor M2, a third transistor M3, a fourth transistor M4, a fifth transistor M5, a sixth transistor M6, a first storage capacitor C1, and a second storage capacitor C2.

As for the first transistor M1, a control electrode of the first transistor M1 is coupled to the scan signal terminal GATE, a first electrode of the first transistor M1 is coupled to the gating data signal terminal DATA2, and a second electrode of the first transistor M1 is coupled to the first node N1. The first transistor M1 is configured to be turned on under the control of the scan signal Gate from the scan signal terminal GATE, and transmit the gating data signal Data2 of the gating data signal terminal DATA2 to the first node N1.

A first terminal of the first storage capacitor C1 is coupled to the initialization signal terminal VINIT, and a second terminal of the first storage capacitor C1 is coupled to the first node N1. The first storage capacitor C1 is configured to receive the gating data signal Data2 at the first node N1 and store the gating data signal Data2.

A control electrode of the second transistor M2 is coupled to the first node N1, a first electrode of the second transistor M2 is coupled to the current control sub-circuit 1, and a second electrode of the second transistor M2 is coupled to the element to be driven 200. The second transistor M2 is configured to be turned on under the control of the voltage at the first node N1, and continuously transmit the gray scale current signal of the current control sub-circuit 1 to the element to be driven 200, so as to drive the element to be driven 200 to continuously emit light.

A control electrode of the third transistor M3 is coupled to the reset signal terminal RESET, a first electrode of the third transistor M3 is coupled to the gating data signal terminal DATA2, and a second electrode of the third transistor M3 is coupled to the second node N2. The third transistor M3 is configured to be turned on under the control of the reset signal Reset from the reset signal terminal RESET, and transmit the gating data signal Data2 of the gating data signal terminal DATA2 to the second node N2.

A first terminal of the second storage capacitor C2 is coupled to the initialization signal terminal VINIT, and a second terminal of the second storage capacitor C2 is coupled to the second node N2. The second storage capacitor C2 is configured to receive the gating data signal Data2 at the second node N2 and store the gating data signal Data2.

A control electrode of the fourth transistor M4 is coupled to the second node N2, a first electrode of the fourth transistor M4 is coupled to the current control sub-circuit 1, and a second electrode of the fourth transistor M4 is coupled to a first electrode of the fifth transistor M5. The fourth transistor M4 is configured to be turned on under the control of the voltage at the second node N2.

A control electrode of the fifth transistor M5 is coupled to the pulse voltage signal terminal HF, and a second electrode of the fifth transistor M5 is coupled to a first electrode of the sixth transistor M6. The fifth transistor M5 is configured to be intermittently turned on under the control of the pulse voltage signal Hf of the pulse voltage signal terminal HF.

A control electrode of the sixth transistor M6 is coupled to the second node N2, and a second electrode of the sixth transistor M6 is coupled to the element to be driven 200. The sixth transistor M6 is configured to be turned on under the control of the voltage at the second node N2.

The fourth transistor M4 and the sixth transistor M6 are turned on under the control of the voltage at the second node N2, and the fifth transistor M5 is intermittently turned on under the control of the pulse voltage signal Hf of the pulse voltage signal terminal HF, so that the gray scale current signal of the current control sub-circuit 1 is intermittently transmitted to the element to be driven 200, and the element to be driven 200 is driven to intermittently emit light.

In some embodiments, as shown in FIGS. 7 to 10, the gating sub-circuit 2 is coupled to the second voltage signal terminal VSS and the element to be driven 200; the current control sub-circuit 1 is coupled to the element to be driven 200.

On this basis, the specific circuit structure of the gating sub-circuit 2 included in the pixel driving circuit 100 provided in the embodiment of the present disclosure is described below as a whole and as an example.

As shown in FIG. 10, the gating sub-circuit 2 includes: a first transistor M1, a second transistor M2, a third transistor M3, a fourth transistor M4, a fifth transistor M5, a sixth transistor M6, a first storage capacitor C1, and a second storage capacitor C2.

As for the first transistor M1, a control electrode of the first transistor M1 is coupled to the scan signal terminal GATE, a first electrode of the first transistor M1 is coupled to the gating data signal terminal DATA2, and a second electrode of the first transistor M1 is coupled to the first node N1. The first transistor M1 is configured to be turned on under the control of the scan signal Gate from the scan signal terminal GATE, and transmit the gating data signal Data2 of the gating data signal terminal DATA2 to the first node N1.

A first terminal of the first storage capacitor C1 is coupled to the initialization signal terminal VINIT, and a second terminal of the first storage capacitor C1 is coupled to the first node N1. The first storage capacitor C1 is configured to receive the gating data signal Data2 at the first node N1 and store the gating data signal Data2.

A control electrode of the second transistor M2 is coupled to the first node N1, a first electrode of the second transistor M2 is coupled to the element to be driven 200, and a second electrode of the second transistor M2 is coupled to the second voltage signal terminal VSS. The second transistor M2 is configured to be turned on under the control of the voltage at the first node N1, so that the gray scale current signal of the current control sub-circuit 1 may be continuously transmitted to the element to be driven 200, and the element to be driven 200 is driven to continuously emit light.

A control electrode of the third transistor M3 is coupled to the reset signal terminal RESET, a first electrode of the third transistor M3 is coupled to the gating data signal terminal DATA2, and a second electrode of the third transistor M3 is coupled to the second node N2. The third transistor M3 is configured to be turned on under the control of the reset signal Reset from the reset signal terminal RESET, and transmit the gating data signal Data2 of the gating data signal terminal DATA2 to the second node N2.

A first terminal of the second storage capacitor C2 is coupled to the initialization signal terminal VINIT, and a second terminal of the second storage capacitor C2 is coupled to the second node N2. The second storage capacitor C2 is configured to receive the gating data signal Data2 at the second node N2 and store the gating data signal Data2.

A control electrode of the fourth transistor M4 is coupled to the second node N2, a first electrode of the fourth transistor M4 is coupled to the element to be driven 200, and a second electrode of the fourth transistor M4 is coupled to a first electrode of the fifth transistor M5. The fourth transistor M4 is configured to be turned on under the control of the voltage at the second node N2.

A control electrode of the fifth transistor M5 is coupled to the pulse voltage signal terminal HF, and a second electrode of the fifth transistor M5 is coupled to a first electrode of the sixth transistor M6. The fifth transistor M5 is configured to be intermittently turned on under the control of the pulse voltage signal Hf of the pulse voltage signal terminal HF.

A control electrode of the sixth transistor M6 is coupled to the second node N2, and a second electrode of the sixth transistor M6 is coupled to the second voltage signal terminal VSS. The sixth transistor M6 is configured to be turned on under the control of the voltage at the second node N2.

The fourth transistor M4 and the sixth transistor M6 are turned on under the control of the voltage at the second node N2, and the fifth transistor M5 is intermittently turned on under the control of the pulse voltage signal Hf of the pulse voltage signal terminal HF, so that the gray scale current signal of the current control sub-circuit 1 may be intermittently transmitted to the element to be driven 200, and the element to be driven 200 is driven to intermittently emit light.

In some embodiments, as shown in FIGS. 11 to 14, the gating sub-circuit 2 is coupled to the first voltage signal terminal VDD and the current control sub-circuit 1; the current control sub-circuit 1 is coupled to the element to be driven 200.

On this basis, the specific circuit structure of the gating sub-circuit 2 included in the pixel driving circuit 100 provided in the embodiment of the present disclosure is described below as a whole and as an example.

As shown in FIG. 14, the gating sub-circuit 2 includes: a first transistor M1, a second transistor M2, a third transistor M3, a fourth transistor M4, a fifth transistor M5, a sixth transistor M6, a first storage capacitor C1, and a second storage capacitor C2.

As for the first transistor M1, a control electrode of the first transistor M1 is coupled to the scan signal terminal GATE, a first electrode of the first transistor M1 is coupled to the gating data signal terminal DATA2, and a second electrode of the first transistor M1 is coupled to the first node N1. The first transistor M1 is configured to be turned on under the control of the scan signal Gate from the scan signal terminal GATE, and transmit the gating data signal Data2 of the gating data signal terminal DATA2 to the first node N1.

A first terminal of the first storage capacitor C1 is coupled to the initialization signal terminal VINIT, and a second terminal of the first storage capacitor C1 is coupled to the first node N1. The first storage capacitor C1 is configured to receive the gating data signal Data2 at the first node N1 and store the gating data signal Data2.

A control electrode of the second transistor M2 is coupled to the first node N1, a first electrode of the second transistor M2 is coupled to the first voltage signal terminal VDD, and a second electrode of the second transistor M2 is coupled to the current control sub-circuit 1. The second transistor M2 is configured to be turned on under the control of the voltage at the first node N1, so that the gray scale current signal of the current control sub-circuit 1 may be continuously transmitted to the element to be driven 200, and the element to be driven 200 is driven to continuously emit light.

A control electrode of the third transistor M3 is coupled to the reset signal terminal RESET, a first electrode of the third transistor M3 is coupled to the gating data signal terminal DATA2, and a second electrode of the third transistor M3 is coupled to the second node N2. The third transistor M3 is configured to be turned on under the control of the reset signal Reset from the reset signal terminal RESET, and transmit the gating data signal Data2 of the gating data signal terminal DATA2 to the second node N2.

A first terminal of the second storage capacitor C2 is coupled to the initialization signal terminal VINIT, and a second terminal of the second storage capacitor C2 is coupled to the second node N2. The second storage capacitor C2 is configured to receive the gating data signal Data2 at the second node N2 and store the gating data signal Data2.

A control electrode of the fourth transistor M4 is coupled to the second node N2, a first electrode of the fourth transistor M4 is coupled to the first voltage signal terminal VDD, and a second electrode of the fourth transistor M4 is coupled to a first electrode of the fifth transistor M5. The fourth transistor M4 is configured to be turned on under the control of the voltage at the second node N2.

A control electrode of the fifth transistor M5 is coupled to the pulse voltage signal terminal HF, and a second electrode of the fifth transistor M5 is coupled to a first electrode of the sixth transistor M6. The fifth transistor M5 is configured to be intermittently turned on under the control of the pulse voltage signal Hf of the pulse voltage signal terminal HF.

A control electrode of the sixth transistor M6 is coupled to the second node N2, and a second electrode of the sixth transistor M6 is coupled to the current control sub-circuit 1. The sixth transistor M6 is configured to be turned on under the control of the voltage at the second node N2.

The fourth transistor M4 and the sixth transistor M6 are turned on under the control of the voltage at the second node N2, and the fifth transistor M5 is intermittently turned on under the control of the pulse voltage signal Hf of the pulse voltage signal terminal HF, so that the gray scale current signal of the current control sub-circuit 1 may be intermittently transmitted to the element to be driven 200, and the element to be driven 200 is driven to intermittently emit light.

In some embodiments, as shown in FIG. 5, the current control sub-circuit 1 in the pixel driving circuit 100 provided by the present disclosure includes a data writing unit 10, a driving unit 11, a compensation unit 12, a storage unit 13, a light emitting control unit 14, and a reset unit 15.

The data writing unit 10 is coupled to the scan signal terminal GATE, the gray scale data signal terminal DATA1, and a third node N3. The data writing unit 10 is configured to transmit the gray scale data signal Data1 from the gray scale data signal terminal DATA1 to the third node N3 under the control of the scan signal Gate from the scan signal terminal GATE. The data writing unit 10 transmits the gray scale data signal Data1 to the third node N3 during a scan phase T2.

The driving unit 11 is coupled to the third node N3, a fourth node N4, and a fifth node N5. The driving unit 11 is configured to be turned on under the control of the voltage at the fifth node N5. The driving unit 11 is turned on under the control of the voltage at the fifth node N5 during a light emitting phase T3.

The compensation unit 12 is coupled to the scan signal terminal GATE, the fourth node N4, and the fifth node N5. The compensation unit 12 is configured to (electrically) connect the fourth node N4 and the fifth node N5 under the control of the scan signal Gate from the scan signal terminal GATE. The compensation unit 12 connects the fourth node N4 and the fifth node N5 during the scan phase T2, and there is a difference between the voltage at the fifth node N5 and the gray scale data signal Data1 transmitted to the third node N3, where the difference is a threshold voltage of the driving unit 11, such that the writing and compensation of the gray scale data signal Data1 is completed.

The storage unit 13 is coupled to the fifth node N5 and the first voltage signal terminal VDD; the storage unit 13 is configured to store the voltage at the fifth node N5. The storage unit 13 stores the compensated voltage at the fifth node N5 during the scan phase T2, and keeps the voltage at the fifth node N5 stable during the light emitting phase T3.

The light emitting control unit 14 is coupled to the enable signal terminal EM, the third node N3, the fourth node N4, and the element to be driven 200. The light emitting control unit 14 is coupled to the first voltage signal terminal VDD and the gating sub-circuit (see FIG. 5); or, the light emitting control unit 14 is coupled to the first voltage signal terminal VDD and the element to be driven 200 (see FIG. 9); or, the light emitting control unit 14 is coupled to the gating sub-circuit 2 and the element to be driven 200 (see FIG. 13). The light emitting control 14 is configured to transmit a gray scale current signal to the element to be driven 20 in cooperation with the driving unit 11 under the control of the enable signal Em from the enable signal terminal EM.

The reset unit 15 is coupled to the reset signal terminal RESET, the initialization signal terminal VINIT, and the fifth node N5. The reset unit 15 is configured to transmit the initialization voltage signal Vinit from the initialization signal terminal VINIT to the fifth node N5 under the control of the reset signal Reset from the reset signal terminal RESET. The reset unit 15 transmits the initialization voltage signal Vinit to the fifth node N5 during a reset phase T1.

For example, by taking the pixel driving circuit shown in FIGS. 3 to 6 as an example, the light emitting control unit 14 is coupled to the first voltage signal terminal VDD. Referring to FIGS. 4, 5 and 6, in the current control sub-circuit 1, during the reset phase T1, the reset unit 15 transmits the initialization voltage signal Vinit to the fifth node N5, and clears the gray scale data signal Data1 of the previous frame stored at the fifth node N5; the storage unit 13 stores the voltage at the fifth node N5; the voltage at the fifth node N5 is related to the initialization voltage signal Vinit, and the voltage at the fifth node N5 may control the driving unit 11 to be turned on. During the scan phase T2, the data writing unit 10 transmits the gray scale data signal Data1 to the third node N3; the driving unit 11 is turned on; the compensation unit 12 connects the fourth node N4 with the fifth node to complete data writing and compensation; the storage unit 13 stores the voltage at the fifth node N5. During the light emitting phase, the light emitting control unit 14 transmits a driving current to the element to be driven 200 in cooperation with the driving unit 11; the magnitude of the driving current is related to the first voltage signal Vdd of the first voltage signal terminal VDD and the voltage at the fifth node N5.

In some embodiments, referring to FIGS. 5 and 6, the data writing unit 10) includes a seventh transistor M7, a control electrode of the seventh transistor M7 is coupled to the scan signal terminal GATE, a first electrode of the seventh transistor M7 is coupled to the gray scale data signal terminal DATA1, and a second electrode of the seventh transistor M7 is coupled to the third node N3. During the scan phase T2, the seventh transistor M7 is turned on under the control of the scan signal Gate from the scan signal terminal GATE, and the gray scale data signal Data1 of the gray scale data signal terminal DATA1 is transmitted to the third node N3.

Referring to FIGS. 5 and 6, the driving unit 11 includes an eighth transistor M8, a control electrode of the eighth transistor M8 is coupled to the fifth node N5, a first electrode of the eighth transistor M8 is coupled to the third node N3, and a second electrode of the eighth transistor M8 is coupled to the fourth node N4. During the scan phase T2 and the light emitting phase T3, the eighth transistor M8 is turned on under the control of the voltage at the fifth node N5.

Referring to FIGS. 5 and 6, the compensation unit 12 includes a ninth transistor M9, a control electrode of the ninth transistor M9 is coupled to the scan signal terminal GATE, a first electrode of the ninth transistor M9 is coupled to the fourth node N4, and a second electrode of the ninth transistor M9 is coupled to the fifth node N5. During the scan phase T2, the ninth transistor M9) is turned on under the control of the scan signal Gate from the scan signal terminal GATE, so as to connect the fourth node N4 and the fifth node N5, and at this time, there is a difference between the voltage at the fifth node N5 and the gray scale data signal Data1 transmitted to the third node N3, where the difference is a threshold voltage of the eighth transistor M8, thereby completing the writing and compensation of the gray scale data signal Data1.

Referring to FIGS. 5 and 6, the storage unit 13 includes a third storage capacitor C3, a first terminal of the third storage capacitor C3 is coupled to the first voltage signal terminal VDD, and a second terminal of the third storage capacitor C3 is coupled to the fifth node N5. During the scan phase T2, the third storage capacitor C3 stores the compensated voltage at the fifth node N5; during the light emitting phase T3, the third storage capacitor C3 keeps the voltage at the fifth node N5 stable, and puts the eighth transistor M8 in a turned-on state.

Referring to FIGS. 5 and 6, the light emitting control unit 14 includes a tenth transistor M10 and an eleventh transistor M11; a control electrode of the tenth transistor M10 is coupled to the enable signal terminal EM, a first electrode of the tenth transistor M10 is coupled to the first voltage signal terminal VDD, and a second electrode of the tenth transistor M10 is coupled to the third node N3: a control electrode of the eleventh transistor M11 is coupled to the enable signal terminal EM, a first electrode of the eleventh transistor M11 is coupled to the fourth node N4, and a second electrode of the eleventh transistor M11 is coupled to the gating sub-circuit 2. During the light emitting phase T3, the tenth transistor M10 and the eleventh transistor M11 are turned on under the control of the enable signal Em from the enable signal terminal EM, and transmit the gray scale current signal to the element to be driven 200 in cooperation with the eighth transistor M8.

Referring to FIGS. 5 and 6, the reset unit 15 includes a twelfth transistor M12, a control electrode of the twelfth transistor M12 is coupled to the reset signal terminal RESET, a first electrode of the twelfth transistor M12 is coupled to the initialization signal terminal VINIT, and a second electrode of the twelfth transistor M12 is coupled to the fifth node N5. During the reset phase T1, the twelfth transistor M12 is turned on under the control of the reset signal Reset from the reset signal terminal RESET, and transmits the initialization voltage signal Vinit to the fifth node N5.

For example, by taking the pixel driving circuit shown in FIGS. 3 to 6 as an example, the light emitting control unit 14 is coupled to the first voltage signal terminal VDD. Referring to FIGS. 4, 5 and 6, in the current control sub-circuit 1, during the reset phase T1, the twelfth transistor M12 is turned on under the control of the reset signal Reset from the reset signal terminal RESET, transmits the initialization voltage signal Vinit to the fifth node N5, and clears the gray scale data signal Data1 of the previous frame stored at the fifth node; the third storage capacitor C3 stores the voltage at the fifth node N5; wherein, the initialization voltage signal Vinit is a low level signal. During the scan phase T2, the seventh transistor M7 is turned on under the control of the scan signal Gate from the scan signal terminal GATE, and the gray scale data signal Data1 of the gray scale data signal terminal DATA1 is transmitted to the third node N3; the eighth transistor M8 is turned on under the control of the voltage at the fifth node N5; the ninth transistor M9 is turned on under the control of the scan signal Gate from the scan signal terminal GATE, and connects the fourth node N4 to the fifth node N5, thereby completing data writing and compensation. During the light emitting phase T3, the tenth transistor M10 and the eleventh transistor M11 are turned on under the control of the enable signal Em from the enable signal terminal EM, the eighth transistor M8 is turned on under the control of the voltage at the fifth node N5, and the light emitting control unit 14 transmits a gray scale current signal to the element to be driven 200.

In some embodiments, referring to FIG. 6, the gating sub-circuit 2 is coupled to the current control sub-circuit 1 and the element to be driven 200; the element to be driven 200 is coupled to the second voltage signal terminal VSS. Here, the current control sub-circuit 1 includes a seventh transistor M7, an eighth transistor M8, a ninth transistor M9, a tenth transistor M10, an eleventh transistor M11, a twelfth transistor M12, and a third storage capacitor C3.

A control electrode of the seventh transistor M7 is coupled to the scan signal terminal GATE, a first electrode of the seventh transistor M7 is coupled to the gray scale data signal terminal DATA1, and a second electrode of the seventh transistor M7 is coupled to the third node N3.

A control electrode of the eighth transistor M8 is coupled to the fifth node N5, a first electrode of the eighth transistor M8 is coupled to the third node N3, and a second electrode of the eighth transistor M8 is coupled to the fourth node N4.

A control electrode of the ninth transistor M9 is coupled to the scan signal terminal GATE, a first electrode of the ninth transistor M9 is coupled to the fourth node N4, and a second electrode of the ninth transistor M9 is coupled to the fifth node N5.

A control electrode of the tenth transistor M10 is coupled to the enable signal terminal EM, a first electrode of the tenth transistor M10 is coupled to the first voltage signal terminal VDD, and a second electrode of the tenth transistor M10 is coupled to the third node N3.

A control electrode of the eleventh transistor M11 is coupled to the enable signal terminal EM, a first electrode of the eleventh transistor M11 is coupled to the fourth node N4, and a second electrode of the eleventh transistor M11 is coupled to the gating sub-circuit 2.

A control electrode of the twelfth transistor M12 is coupled to the reset signal terminal RESET, a first electrode of the twelfth transistor M12 is coupled to the initialization signal terminal VINIT, and a second electrode of the twelfth transistor M12 is coupled to the fifth node N5.

A first terminal of the third storage capacitor C3 is coupled to the first voltage signal terminal VDD, and a second terminal of the third storage capacitor C3 is coupled to the fifth node N5.

Figure 15:
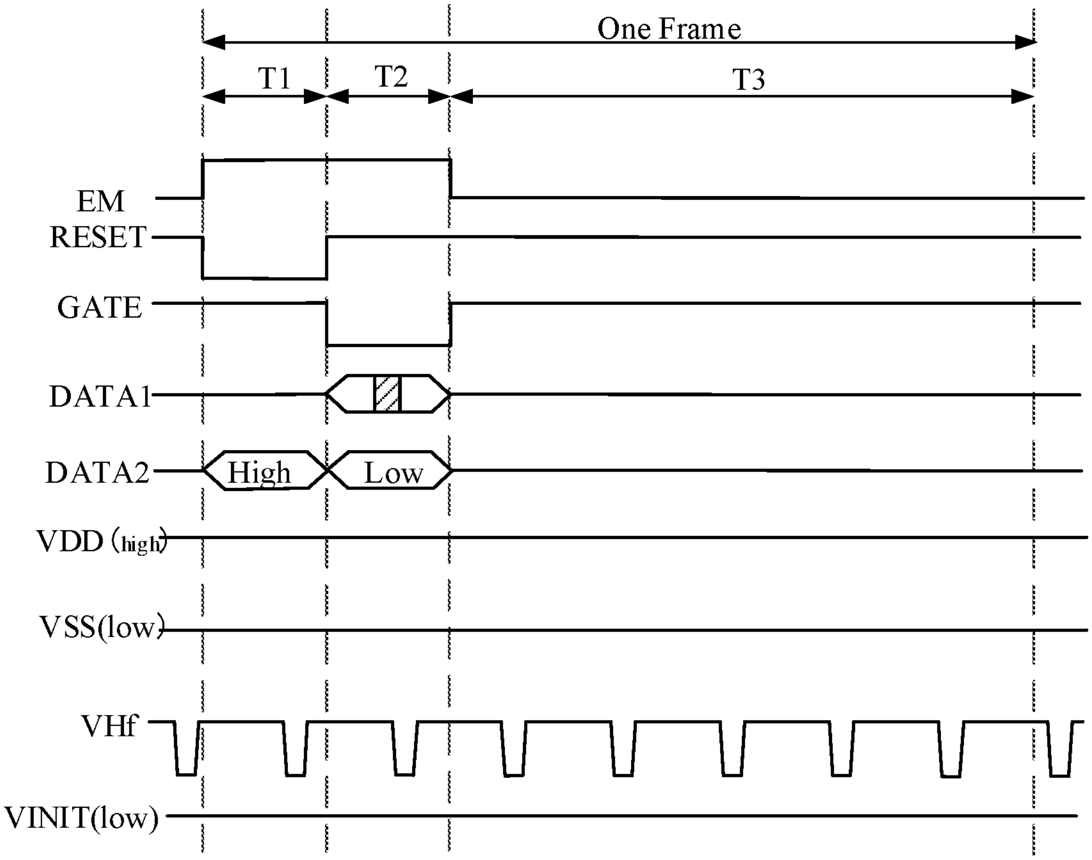
FIG. 15 is a timing diagram when a pixel driving circuit according to some embodiments is displaying a high gray scale.
Figure 16:
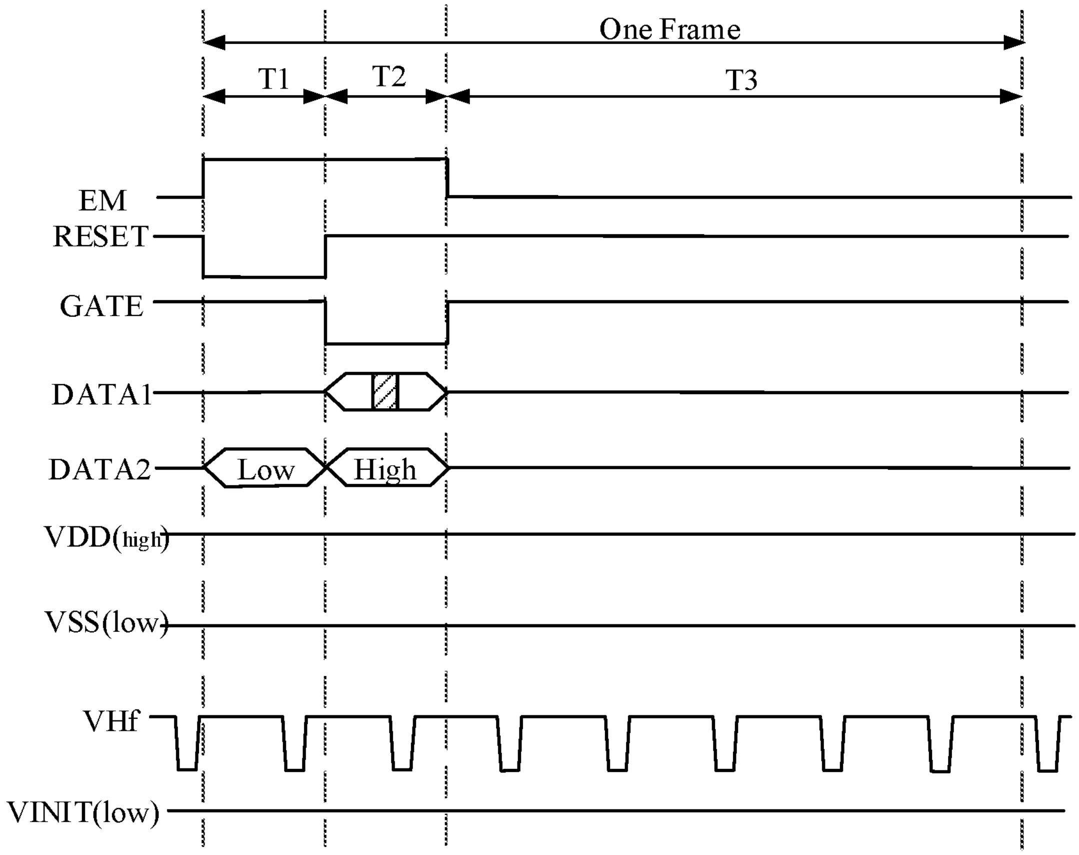
FIG. 16 is a timing diagram when a pixel driving circuit according to some embodiments is displaying a low gray scale.

Some embodiments of the present disclosure also provide a pixel driving method applied to the pixel driving circuit 100 of any of the above embodiments, as shown in FIGS. 3 and 4, the gating sub-circuit 2 of the pixel driving circuit 100 includes a first gating unit 21 and a second gating unit 22. As shown in FIGS. 15 and 16, one frame period includes a reset phase T1, a scan phase T2, and a light emitting phase T3. The pixel driving method includes:

as shown in FIG. 15, in the case where the display luminance is required to be a high gray level, during the reset phase T1, the second gating unit 22 writes a turn-off voltage of the gating data signal Data2 from the gating data signal terminal DATA2 under the control of the reset signal Reset from the reset signal terminal RESET, and the second gating unit 22 is turned off;

during the scan phase T2, the first gating unit 21 writes a turn-on voltage of the gating data signal Data2 from the gating data signal terminal DATA2 under the control of the scan signal Gate from the scan signal terminal GATE, and the first gating unit 21 is continuously turned on;

during the light emitting phase T3, the first gating unit 21 drives the element to be driven 200 to continuously emit light in cooperation with the current control sub-circuit 1 of the pixel driving circuit 100 under the control of the turn-on voltage of the gating data signal Data2.

As shown in FIG. 16, in the case where the display luminance is required to be a low gray scale, the method includes:

during the reset phase T1, the second gating unit 22 writes a turn-on voltage of the gating data signal Data2 from the gating data signal terminal DATA2 under the control of the reset signal Reset from the reset signal terminal RESET, and the second gating unit 22 is intermittently turned on under the control of the pulse voltage signal Hf of the pulse voltage signal terminal HF;

during the scan phase T2, the first gating unit 21 writes a turn-off voltage of the gating data signal Data2 from the gating data signal terminal DATA2 under the control of the scan signal Gate of the scan signal terminal GATE, and the first gating unit 21 turns off;

during the light emitting phase T3, the second gating unit 22 drives the element to be driven 200 to intermittently emit light in cooperation with the current control sub-circuit 1 under the control of the turn-on voltage of the gating data signal Data2 and the pulse voltage signal Hf from the pulse voltage signal terminal HF.

For example, by taking the pixel driving circuit 100 shown in FIG. 6 as an example, in the case where the display luminance is required to be a high gray scale, FIGS. 6 and 15 are referred to for the gating sub-circuit 2.

During the reset phase T1, the reset signal Reset of the reset signal terminal RESET is a low level signal, the third transistor M3 is turned on, and a turn-off voltage Vd (high level signal) of the gating data signal Data2 of the gating data signal terminal DATA2 is transmitted to the second node N2. The scan signal Gate of the scan signal terminal GATE is a high level signal, the first transistor M1 is turned off, and a turn-off voltage Vd (high level signal) of the gray scale data signal Data2 of the gray scale data signal terminal DATA2 cannot be transmitted to the first node N1.

During the scan phase T2, the reset signal Reset of the reset signal terminal RESET is a high level signal, the third transistor M3 is turned off, and the second node N2 maintains the turn-off voltage Vd (high level signal) under the action of the second capacitor C2. The scan signal Gate of the scan signal terminal GATE is a low level signal, the first transistor M1 is turned on, and a turn-on voltage Vt (low level signal) of the gray scale data signal Data2 of the gray scale data signal terminal DATA2 is transmitted to the first node N1.

During the light emitting phase T3, the reset signal Reset of the reset signal terminal RESET is a high level signal, the third transistor M3 is turned off, the second node N2 maintains the turn-off voltage Vd (high level signal) under the action of the second capacitor C2, the fourth transistor M4 and the sixth transistor M6 are turned off, and the second gating unit 22 is turned off. The scan signal Gate of the scan signal terminal GATE is a high level signal, the first transistor M1 is turned off, the first node N1 maintains the turn-on voltage Vt (low level signal) under the action of the first capacitor C1, the second transistor M2 is turned on, the first gating unit 21 is continuously turned on, and the element to be driven 200 continuously emits light.

In the case where the element to be driven 200 is required to display a low gray level in luminance, for the gating sub-circuit 2, FIG. 6 and FIG. 16 are referred to.

During the reset phase T1, the reset signal Reset of the reset signal terminal RESET is a low level signal, the third transistor M3 is turned on, and a turn-on voltage Vt (low level signal) of the second data signal Data2 of the second data signal terminal DATA2 is transmitted to the second node N2. The scan signal Gate of the scan signal terminal GATE is a high level signal, the first transistor M1 is turned off, and the turn-on voltage Vt (low level signal) of the gray scale data signal Data2 of the gray scale data signal terminal DATA2 cannot be transmitted to the first node N1.

During the scan phase T2, the reset signal Reset of the reset signal terminal RESET is a high level signal, the third transistor M3 is turned off, and the second node N2 maintains the turn-on voltage Vt (low level signal) under the action of the second capacitor C2. The scan signal Gate of the scan signal terminal GATE is a low level signal, the first transistor M1 is turned on, and a turn-off voltage Vd (high level signal) of the gray scale data signal Data2 of the gray scale data signal terminal DATA2 is transmitted to the first node N1.

During the light emitting phase T3, the reset signal Reset of the reset signal terminal RESET is a high level signal, the third transistor M3 is turned off, the second node N2 maintains the turn-on voltage Vt (low level signal) under the action of the second capacitor C2, the fourth transistor M4 and the sixth transistor M6 are turned on, and the second gating unit 22 is intermittently turned on under the control of the pulse voltage signal Hf of the pulse voltage signal terminal HF. The scan signal Gate of the scan signal terminal GATE is a high level signal, the first transistor M1 is turned off, the first node N1 maintains the turn-off voltage Vd (high level signal) under the action of the first capacitor C1, the second transistor M2 is turned off, and the first gating unit 21 is turned off. The element to be driven 200 intermittently emits light. When the pulse voltage signal Hf is a low level signal, the element to be driven 200 emits light.

With the above-mentioned pixel driving method, when a high gray scale is required to be displayed, the first gating unit 21 is continuously turned on, the second gating unit 22 is turned off, so that the element to be driven 200 continuously receives gray scale current signals, the element to be driven 200 continuously emits light in one frame, the magnitude of the current flowing through the element to be driven 200 is controlled through the gray scale data signals Data1 from the gray scale data signal terminal DATA1, thus the light emitting luminance of the element to be driven 200 in one frame is controlled, so that different high gray scales are displayed.

When a low gray scale is required to be displayed, the first gating unit 21 is turned off, the second gating unit 21 is intermittently turned on, so that the element to be driven 200 intermittently receives a gray scale current signal, the element to be driven 200 intermittently emits light in one frame, the light emitting duration of the element to be driven 200 in one frame is shortened, the light emitting luminance of the element to be driven 200 in one frame is reduced, thus the current received by the element to be driven 200 may be adjusted in a higher range, so that different low gray scales are displayed.

In some embodiments, the pixel driving method further includes:

- during the reset phase T1, the reset signal Reset of the reset signal terminal RESET is a low level signal, the twelfth transistor M12 is turned on, the initialization signal Vinit (low level signal) of the initialization signal terminal VINIT is transmitted to the fifth node N5, and the gray scale data signal Data1 of the previous frame stored at the fifth node is cleared; the third capacitor C3 stores the voltage at the fifth node N5;
- during the scan phase T2, the scan signal Gate from the scan signal terminal GATE is a low level signal, the seventh transistor M7 and the ninth transistor M9 are turned on, and the gray scale data signal Data1 of the gray scale data signal terminal DATA1 is transmitted to the third node N3; the eighth transistor M8 is turned on under the control of the voltage (low level signal) at the fifth node N5, and the fourth node is connected to the fifth node N5, thereby completing data writing and compensation;
- during the light emitting phase T3, the enable signal Em from the enable signal terminal EM is a low level signal, the tenth transistor M10 and the eleventh transistor M11 are turned on, the eighth transistor M8 is turned on under the control of the voltage at the fifth node N5, and the current control sub-circuit 1 transmits a gray scale current signal to the element to be driven 200.

Some embodiments of the present disclosure further provide a display panel 1100, which includes the pixel driving circuit 100 and the element to be driven 200 of any one of the above embodiments.

Compared with the prior art, the beneficial effects of the display panel provided by the present disclosure are the same as the beneficial effects of the pixel driving circuit provided by the above technical scheme, and are not described here again.

Figure 2:
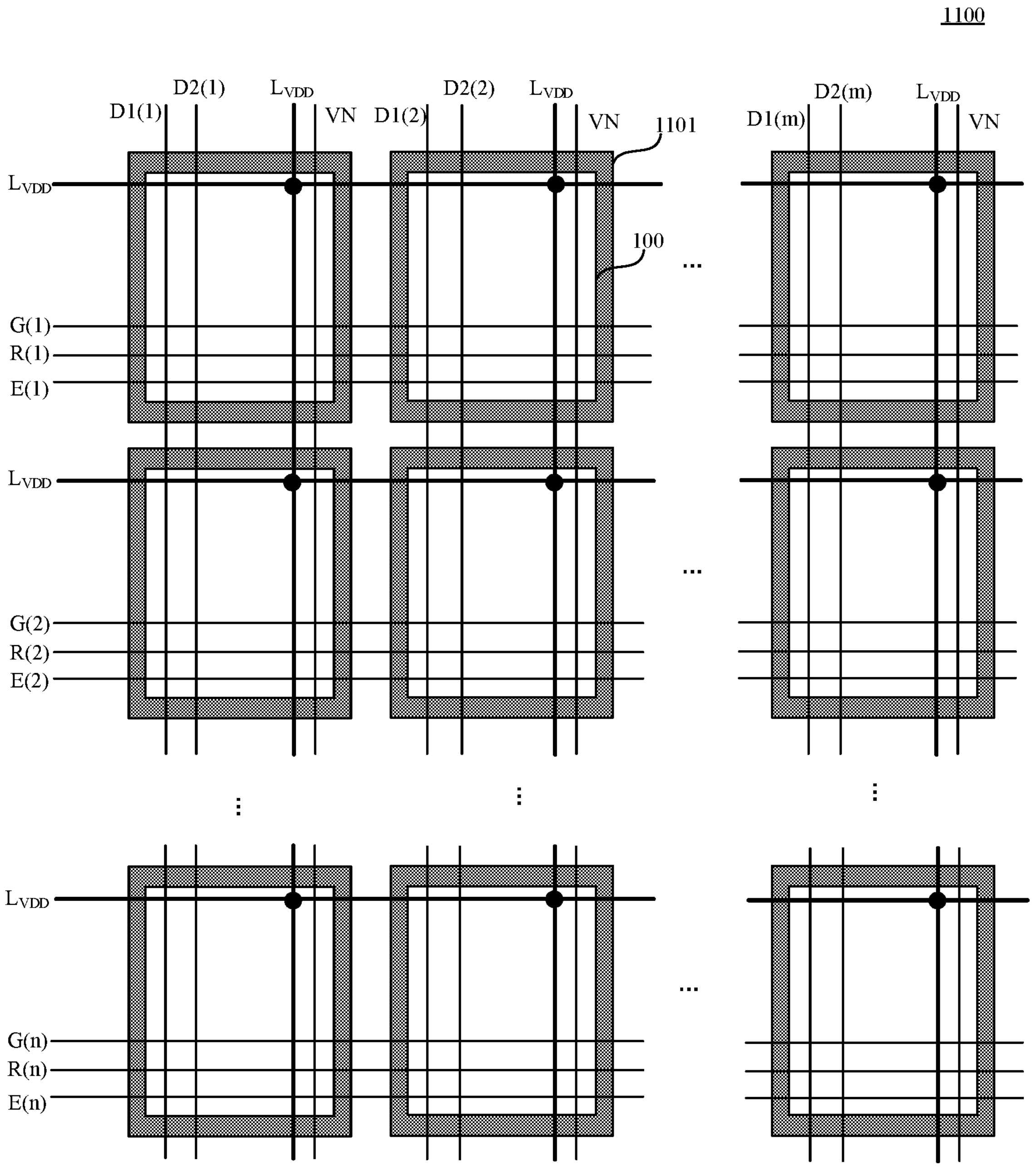
FIG. 2 is a structural diagram of a display panel according to some embodiments.

Referring to FIG. 2, the display panel 1100 includes a plurality of sub-pixels 1101, each sub-pixel 1101 corresponds to one pixel driving circuit 100 and one element to be driven 200 (see FIG. 3), the plurality of sub-pixels 1101 are arranged in an array of a plurality of rows and a plurality of columns. For example, the plurality of sub-pixels 101 are arranged in an array of n rows and m columns.

In some embodiments, the element to be driven 200 includes at least one light emitting diode connected in series in a current path of the pixel driving circuit 100. The light emitting diode is a micro light emitting diode (micro LED), a mini LED or other light emitting device having characteristics of high light emitting efficiency at high current density and low light emitting efficiency at low current density, such as an organic light emitting diode, a quantum dot light emitting diode, which is not limited by the embodiments of the present disclosure. In the description of the embodiments of the present disclosure, a first electrode of the element to be driven 200 is an anode of the element to be driven 200, and a second electrode of the element to be driven 200 is a cathode of the element to be driven.

The display panel 1100 further includes: a plurality of scan signal lines G(1)-G(n), a plurality of gray scale data signal lines D1(1)-D1(*m*), and a plurality of grating data signal lines D2(1)-D2(*m*).

The pixel driving circuits 100 of a same row of sub-pixels 1101 are coupled to a same scan signal line G. The pixel driving circuits 100 of a same column of sub-pixels 1101 are coupled to a same gray scale data signal line D1 and a same grating data signal line D2. For example, the pixel driving circuits 100 corresponding to a first row of sub-pixels 1101 are coupled to a first scan signal line G(1), and the pixel driving circuits 100 corresponding to a first column of sub-pixels 1101 are coupled to a gray scale data signal line D1(1) and a grating data signal line D2(1).

Thus, the plurality of scan signal lines G provide scan signals Gate1 for the scan signal terminal GATE; the plurality of gray scale data signal lines D1 provide gray scale data signals Data1 for the gray scale data signal terminals DATA1; the plurality of gating data signal lines D2 provide the gating data signals Data2 to the gating data signal terminals DATA2. Thereby, the pixel driving circuit 100 is supplied with the scan signal Gate, the gray scale data signal Data1, and the gating data signal Data2.

The display panel 1100 further includes: a plurality of reset signal lines R(1) to R (n), a plurality of enable signal lines E(1) to E(n), a plurality of initialization signal lines VN, a plurality of first voltage signal lines $L_{VDD}$, a plurality of second voltage signal lines LVSS (not shown in drawing), and a plurality of pulse signal lines LHF (not shown in drawing).

The pixel driving circuits 100 corresponding to a same row of sub-pixels 1101 are coupled to a same reset signal line R and a same enable signal line E. The pixel driving circuits 100 corresponding to a same column of sub-pixels 1101 are coupled to a same initialization signal line VN.

Thus, the plurality of reset signal lines R provide a reset signal Reset to a reset signal terminal RESET, the plurality of enable signal lines E provide an enable signal Em to an enable signal terminal EM, and the plurality of initialization signal lines VN provide an initialization signal Vinit to an initialization signal terminal VINIT.

The plurality of first voltage signal lines $L_{VDD}$ are respectively arranged in a grid along a row direction and a column direction, and pixel driving circuits 100 corresponding to a same column of sub-pixels 1101 are coupled to a same first voltage signal line $L_{VDD}$ arranged along the column direction. The plurality of first voltage signal lines $L_{VDD}$ arranged in the row direction are respectively coupled to the plurality of first voltage signal lines $L_{VDD}$ arranged in the column direction, and are configured to reduce a resistance of the plurality of first voltage signal lines $L_{VDD}$ arranged in the column direction, and reduce an RC load and an IR Drop of a first voltage signal Vdd. The wiring manner of the plurality of second voltage signal lines LVSS and the plurality of pulse voltage signal lines LVHF is similar to that of the plurality of first voltage signal lines $L_{VDD}$, and is not repeated here.

Thus, the plurality of first voltage signal lines $L_{VDD}$ arranged in the column direction provide the first voltage signal Vdd to the first voltage signal terminal VDD, the plurality of second voltage signal lines LVSS arranged in the column direction provide the first voltage signal Vss to the second voltage signal terminal VSS, and the plurality of pulse voltage signal lines LHf arranged in the column direction provide the pulse voltage signal Hf to the pulse voltage signal terminal HF.

It should be noted that the arrangement of the plurality of signal lines included in the display panel 1100 described above and the wiring diagram of the display panel 1100 shown in FIG. 2 are merely examples, and do not constitute a limit to the structure of the display panel 1100.

In some embodiments, the display panel 1100 further includes a substrate on which the pixel driving circuit is disposed, the substrate being a glass substrate.

In some embodiments, the above display panel 1100 is a Micro LED display panel, and each of the plurality of sub-pixels included in the display panel 1100 corresponds to at least one Micro LED.

As the pixel driving circuit 100 provided by the present disclosure is directed to the characteristics of the micro light emitting diode that the light emitting efficiency is high at a high current density and the light emitting efficiency is low at a low current density, displaying of different gray scales is realized by combining the control of the current and the control of the light emitting duration. When displaying the lower gray scale, the light emitting duration of the micro light emitting diode is shortened, so that the current input to the micro light emitting diode is kept in a higher range, thus the micro light emitting diode is always at a high current density; the light emitting efficiency is higher, further the power consumption of the display panel is reduced, and the cost is saved. In this way, the display panel provided by the present disclosure is suitable for an active drive mode.

The display panel provided by the present disclosure adopts an active drive mode, the pixel driving circuit 100 may be arranged on the substrate made of glass, as the splicing process of the glass substrate is mature, the display panel may be spliced according to the display size to obtain the display panel with a larger display size, which is suitable for being watched at a medium distance.

For example, the display panel is a television screen. Moreover, since the display panel adopts an active drive mode and adopts the glass substrate as the substrate, the pixel driving circuit may be manufactured by adopting the processes of exposure, development, etching and the like with higher manufacturing process precision, so that the obtained pixel driving circuit 100 has higher precision, and a size of the sub-pixel may be reduced. For example, the size of the sub-pixel may be 400 μm or less, thereby improving the resolution of the display panel and ensuring better fineness of the image quality of the display picture. In a case where the display panel is a Micro LED display panel, the color gamut and the luminance of the display panel are improved, HDR display may be realized, and the display effect of a display picture of the display panel is improved.

In some embodiments, the transistors in the pixel driving circuit 100 included in the display panel 1100 are manufactured on a glass substrate by a Low Temperature Poly-silicon (LTPS) process: as the low temperature poly-silicon has the characteristics of high mobility and good stability, the response speed of the manufactured transistors may be increased, and the LTPS process is more suitable for the pixel driving circuit 100 provided by the present disclosure, which is controlled by a driving current and a driving duration. Meanwhile, since the compensation of the threshold voltage of the eighth transistor M8 has been performed in the driving method of the pixel driving circuit 100, the display effect of the display panel 1100 is not affected by the shift of the threshold voltage of the transistor due to the defect of the LTPS process.

Some embodiments of the present disclosure further provide a display device 1000, as shown in FIG. 1, the display device 1000 includes the display panel 1100 of any one of the above embodiments, a circuit board, a display driver integrated circuit (IC), and other electronic components.

Here, the display device 1000 may be a television, a computer, a notebook computer, a mobile phone, a tablet computer, a personal digital assistant (PDA), a vehicle-mounted computer, or the like.

Compared with the prior art, the beneficial effects of the display device provided by the present disclosure are the same as the beneficial effects of the pixel driving circuit provided by the above technical scheme, and are not described herein again.

The above description is only for the specific embodiments of the present disclosure, but the scope of the present disclosure is not limited thereto, and any changes or substitutions, which may be easily conceived by one of ordinary skill in the art within the technical scope of the present disclosure, should be covered within the scope of the present disclosure. Therefore, the protection scope of the present disclosure shall be subject to the protection scope of the claims.

What is claimed is:

1. A pixel driving circuit, comprising:

a current control sub-circuit coupled to a scan signal terminal, a gray scale data signal terminal, a first voltage signal terminal, and an enable signal terminal; the current control sub-circuit being configured to output a gray scale current signal to an element to be driven, according to a gray scale data signal from the gray scale data signal terminal, under the control of a scan signal from the scan signal terminal and an enable signal from the enable signal terminal;

a gating sub-circuit coupled to the scan signal terminal, a reset signal terminal, a gating data signal terminal, and a pulse voltage signal terminal; the gating sub-circuit being configured to drive the element to be driven to continuously emit light, under the control of the scan signal from the scan signal terminal and a gating data signal from the gating data signal terminal, and to drive the element to be driven to intermittently emit light, under the control of a reset signal from the reset signal terminal, the gating data signal from the gating data signal terminal and a pulse voltage signal from the pulse voltage signal terminal;

wherein the gating sub-circuit comprises:

a first gating unit coupled to the scan signal terminal and the gating data signal terminal; the first gating unit being configured to drive the element to be driven to continuously emit light, under the control of the scan signal from the scan signal terminal and the gating data signal from the gating data signal terminal;

a second gating unit coupled to the reset signal terminal, the gating data signal terminal, and the pulse voltage signal terminal; the second gating unit being configured to drive the element to be driven to intermittently emit light, under the control of the reset signal from the reset signal terminal, the gating data signal from the gating data signal terminal and the pulse voltage signal from the pulse voltage signal terminal; and wherein the second gating unit comprises:

a second data writing sub-unit coupled to the reset signal terminal, the gating data signal terminal, and a second node; the second data writing sub-unit being configured to transmit the gating data signal from the gating data signal terminal to the second node under the control of the reset signal from the reset signal terminal;

a second storage sub-unit coupled to an initialization signal terminal and the second node; the second storage sub-unit being configured to store a voltage at the second node;

a second control sub-unit coupled to the second node and the pulse voltage signal terminal; the second control sub-unit being configured to drive the element to be driven to intermittently emit light, under the control of the voltage at the second node and the pulse voltage signal from the pulse voltage signal terminal.

2. The pixel driving circuit according to claim 1, wherein the first gating unit comprises:

a first data writing sub-unit coupled to the scan signal terminal, the gating data signal terminal, and a first node; the first data writing sub-unit being configured to transmit the gating data signal from the gating data signal terminal to the first node under the control of the scan signal from the scan signal terminal;

a first storage sub-unit coupled to an initialization signal terminal and the first node; the first storage sub-unit being configured to store a voltage at the first node;

a first control sub-unit coupled to the first node; the first control sub-unit being configured to drive the element to be driven to continuously emit light under the control of the voltage at the first node; and the first data writing sub-unit comprises:

a first transistor having a control electrode coupled to the scan signal terminal, a first electrode coupled to the gating data signal terminal, and a second electrode coupled to the first node;

a first storage sub-unit comprises:

a first storage capacitor having a first terminal coupled to the initialization signal terminal and a second terminal coupled to the first node;

the first control sub-unit comprises:

a second transistor having a control electrode coupled to the first node.

3. The pixel driving circuit according to claim 2, wherein a first electrode of the second transistor is coupled to the first voltage signal terminal, and a second electrode of the second transistor is coupled to the current control sub-circuit; or, a first electrode of the second transistor is coupled to the current control sub-circuit, and a second electrode of the second transistor is coupled to the element to be driven; or, a first electrode of the second transistor is coupled to the element to be driven, and a second electrode of the second transistor is coupled to a second voltage signal terminal.

4. The pixel driving circuit according to claim 1, wherein the second data writing sub-unit comprises:

a third transistor having a control electrode coupled to the reset signal terminal, a first electrode coupled to the gating data signal terminal, and a second electrode coupled to the second node;

the second storage sub-unit comprises:

a second storage capacitor having a first terminal coupled to the initialization signal terminal and a second terminal coupled to the second node;

the second control sub-unit comprises:

a fourth transistor having a control electrode coupled to the second node;

a fifth transistor having a control electrode coupled to the pulse voltage signal terminal, a first electrode coupled to a second electrode of the fourth transistor;

a sixth transistor having a control electrode coupled to the second node, a first electrode coupled to a second electrode of the fifth transistor.

5. The pixel driving circuit according to claim 4, wherein a first electrode of the fourth transistor is coupled to the first voltage signal terminal, and a second electrode of the sixth transistor is coupled to the current control sub-circuit; or, a first electrode of the fourth transistor is coupled to the current control sub-circuit, and a second electrode of the sixth transistor is coupled to the element to be driven; or, a first electrode of the fourth transistor is coupled to the element to be driven, and a second electrode of the sixth transistor is coupled to a second voltage signal terminal.

6. A pixel driving circuit, comprising:

a current control sub-circuit coupled to a scan signal terminal, a gray scale data signal terminal, a first voltage signal terminal, and an enable signal terminal; the current control sub-circuit being configured to output a gray scale current signal to an element to be driven, according to a gray scale data signal from the gray scale data signal terminal, under the control of a scan signal from the scan signal terminal and an enable signal from the enable signal terminal;

a gating sub-circuit coupled to the scan signal terminal, a reset signal terminal, a gating data signal terminal, and a pulse voltage signal terminal; the gating sub-circuit being configured to drive the element to be driven to continuously emit light, under the control of the scan signal from the scan signal terminal and a gating data signal from the gating data signal terminal, and to drive the element to be driven to intermittently emit light, under the control of a reset signal from the reset signal terminal, the gating data signal from the gating data signal terminal and a pulse voltage signal from the pulse voltage signal terminal wherein the gating sub-circuit is coupled to the first voltage signal terminal and the current control sub-circuit; the current control sub-circuit is coupled to the element to be driven, and wherein the gating sub-circuit comprises:

a first transistor having a control electrode coupled to the scan signal terminal, a first electrode coupled to the gating data signal terminal, and a second electrode coupled to the first node;

a first storage capacitor having a first terminal coupled to an initialization signal terminal and a second terminal coupled to the first node;

a second transistor having a control electrode coupled to the first node, a first electrode coupled to the first voltage signal terminal, and a second electrode coupled to the current control sub-circuit;

a third transistor having a control electrode coupled to the reset signal terminal, a first electrode coupled to the gating data signal terminal, and a second electrode coupled to the second node;

a second storage capacitor having a first terminal coupled to the initialization signal terminal and a second terminal coupled to the second node;

a fourth transistor having a control electrode coupled to the second node, a first electrode coupled to the first voltage signal terminal;

a fifth transistor having a control electrode coupled to the pulse voltage signal terminal, a first electrode coupled to a second electrode of the fourth transistor;

a sixth transistor having a control electrode coupled to the second node, a first electrode coupled to a second electrode of the fifth transistor, and a second electrode coupled to the current control sub-circuit.

7. The pixel driving circuit according to claim 6, wherein the current control sub-circuit comprises:

a data writing unit coupled to the scan signal terminal, the gray scale data signal terminal, and a third node; the data writing unit being configured to transmit a gray scale data signal received at the gray scale data signal terminal to the third node under the control of the scan signal from the scan signal terminal;

a driving unit coupled to the third node, a fourth node, and a fifth node; the driving unit being configured to be turned on under the control of a voltage at the fifth node;

a compensation unit coupled to the scan signal terminal, the fourth node, and the fifth node; the compensation unit being configured to compensate the voltage at the fifth node under the control of the scan signal from the scan signal terminal, so that the voltage at the fifth node is related to a threshold voltage of the driving unit;

a storage unit coupled to the fifth node and the first voltage signal terminal; the storage unit being configured to store the voltage at the fifth node;

a light emitting control unit coupled to the enable signal terminal, the third node, and the fourth node; the light emitting control unit being configured to transmit the gray scale current signal to the element to be driven in cooperation with the driving unit under the control of the enable signal from the enable signal terminal;

a reset unit coupled to the reset signal terminal, an initialization signal terminal, and the fifth node; the reset unit being configured to transmit an initialization signal from the initialization signal terminal to the fifth node under the control of the reset signal from the reset signal terminal.

8. The pixel driving circuit according to claim 7, wherein the light emitting control unit is coupled to the first voltage signal terminal and the gating sub-circuit; or, the light emitting control unit is coupled to the first voltage signal terminal and the element to be driven; or, the light emitting control unit is coupled to the gating sub-circuit and the element to be driven.

9. The pixel driving circuit according to claim 7, wherein the data writing unit comprises:

a seventh transistor having a control electrode coupled to the scan signal terminal, a first electrode coupled to the gray scale data signal terminal, and a second electrode coupled to the third node;

the driving unit comprises:

an eighth transistor having a control electrode coupled to the fifth node, a first electrode coupled to the third node, and a second electrode coupled to the fourth node;

the compensation unit comprises:

a ninth transistor having a control electrode coupled to the scan signal terminal, a first electrode coupled to the fourth node, and a second electrode coupled to the fifth node;

the storage unit comprises:

a third storage capacitor having a first terminal coupled to the first voltage signal terminal and a second terminal coupled to the fifth node;

the light emitting control unit comprises:

a tenth transistor having a control electrode coupled to the enable signal terminal, and a second electrode coupled to the third node;

an eleventh transistor having a control electrode coupled to the enable signal terminal, and a first electrode coupled to the fourth node, wherein a first electrode of the tenth transistor is coupled to the first voltage signal terminal, and a second electrode of the eleventh transistor is coupled to the gating sub-circuit; or, a first electrode of the tenth transistor is coupled to the first voltage signal terminal, and a second electrode of the eleventh transistor is coupled to the element to be driven; or, a first electrode of the tenth transistor is coupled to the gating sub-circuit, and a second electrode of the eleventh transistor is coupled to the element to be driven, the reset unit comprises:

a twelfth transistor having a control electrode coupled to the reset signal terminal, a first electrode coupled to the initialization signal terminal, and a second electrode coupled to the fifth node.

10. A pixel driving circuit, comprising:

a current control sub-circuit coupled to a scan signal terminal, a gray scale data signal terminal, a first voltage signal terminal, and an enable signal terminal; the current control sub-circuit being configured to output a gray scale current signal to an element to be driven, according to a gray scale data signal from the gray scale data signal terminal, under the control of a scan signal from the scan signal terminal and an enable signal from the enable signal terminal;

a gating sub-circuit coupled to the scan signal terminal, a reset signal terminal, a gating data signal terminal, and a pulse voltage signal terminal; the gating sub-circuit being configured to drive the element to be driven to continuously emit light, under the control of the scan signal from the scan signal terminal and a gating data signal from the gating data signal terminal, and to drive the element to be driven to intermittently emit light, under the control of a reset signal from the reset signal terminal, the gating data signal from the gating data signal terminal and a pulse voltage signal from the pulse voltage signal terminal, wherein the current control sub-circuit comprises:

a data writing unit coupled to the scan signal terminal, the gray scale data signal terminal, and a third node; the data writing unit being configured to transmit a gray scale data signal received at the gray scale data signal terminal to the third node under the control of the scan signal from the scan signal terminal;

a driving unit coupled to the third node, a fourth node, and a fifth node; the driving unit being configured to be turned on under the control of a voltage at the fifth node;

a compensation unit coupled to the scan signal terminal, the fourth node, and the fifth node; the compensation unit being configured to compensate the voltage at the fifth node under the control of the scan signal from the scan signal terminal, so that the voltage at the fifth node is related to a threshold voltage of the driving unit;

a storage unit coupled to the fifth node and the first voltage signal terminal; the storage unit being configured to store the voltage at the fifth node;

a light emitting control unit coupled to the enable signal terminal, the third node, and the fourth node; the light emitting control unit being configured to transmit the gray scale current signal to the element to be driven in cooperation with the driving unit under the control of the enable signal from the enable signal terminal;

a reset unit coupled to the reset signal terminal, an initialization signal terminal, and the fifth node; the reset unit being configured to transmit an initialization signal from the initialization signal terminal to the fifth node under the control of the reset signal from the reset signal terminal.

11. The pixel driving circuit according to claim 10, wherein the light emitting control unit is coupled to the first voltage signal terminal and the gating sub-circuit; or, the light emitting control unit is coupled to the first voltage signal terminal and the element to be driven; or, the light emitting control unit is coupled to the gating sub-circuit and the element to be driven.

12. The pixel driving circuit according to claim 10, wherein the data writing unit comprises:

a seventh transistor having a control electrode coupled to the scan signal terminal, a first electrode coupled to the gray scale data signal terminal, and a second electrode coupled to the third node;

the driving unit comprises:

an eighth transistor having a control electrode coupled to the fifth node, a first electrode coupled to the third node, and a second electrode coupled to the fourth node;

the compensation unit comprises:

a ninth transistor having a control electrode coupled to the scan signal terminal, a first electrode coupled to the fourth node, and a second electrode coupled to the fifth node;

the storage unit comprises:

a third storage capacitor having a first terminal coupled to the first voltage signal terminal and a second terminal coupled to the fifth node;

the light emitting control unit comprises:

a tenth transistor having a control electrode coupled to the enable signal terminal, and a second electrode coupled to the third node;

an eleventh transistor having a control electrode coupled to the enable signal terminal, and a first electrode coupled to the fourth node, wherein a first electrode of the tenth transistor is coupled to the first voltage signal terminal, and a second electrode of the eleventh transistor is coupled to the gating sub-circuit; or, a first electrode of the tenth transistor is coupled to the first voltage signal terminal, and a second electrode of the eleventh transistor is coupled to the element to be driven; or, a first electrode of the tenth transistor is coupled to the gating sub-circuit, and a second electrode of the eleventh transistor is coupled to the element to be driven, the reset unit comprises:

a twelfth transistor having a control electrode coupled to the reset signal terminal, a first electrode coupled to the initialization signal terminal, and a second electrode coupled to the fifth node.

13. The pixel driving circuit according to claim 10, wherein the gating sub-circuit is coupled to the first voltage signal terminal and the current control sub-circuit; the current control sub-circuit is coupled to the element to be driven, and wherein the gating sub-circuit comprises:

a first transistor having a control electrode coupled to the scan signal terminal, a first electrode coupled to the gating data signal terminal, and a second electrode coupled to the first node;

a first storage capacitor having a first terminal coupled to an initialization signal terminal and a second terminal coupled to the first node;

a second transistor having a control electrode coupled to the first node, a first electrode coupled to the first voltage signal terminal, and a second electrode coupled to the current control sub-circuit;

a third transistor having a control electrode coupled to the reset signal terminal, a first electrode coupled to the gating data signal terminal, and a second electrode coupled to the second node;

a second storage capacitor having a first terminal coupled to the initialization signal terminal and a second terminal coupled to the second node;

a fourth transistor having a control electrode coupled to the second node, a first electrode coupled to the first voltage signal terminal;

a fifth transistor having a control electrode coupled to the pulse voltage signal terminal, a first electrode coupled to a second electrode of the fourth transistor;

a sixth transistor having a control electrode coupled to the second node, a first electrode coupled to a second electrode of the fifth transistor, and a second electrode coupled to the current control sub-circuit.

14. The pixel driving circuit according to claim 10, wherein the gating sub-circuit is coupled to the current control sub-circuit and the element to be driven;

the element to be driven is coupled to a second voltage signal terminal, wherein the gating sub-circuit comprises:

a first transistor having a control electrode coupled to the scan signal terminal, a first electrode coupled to the gating data signal terminal, and a second electrode coupled to a first node;

a first storage capacitor having a first terminal coupled to an initialization signal terminal and a second terminal coupled to the first node;

a second transistor having a control electrode coupled to the first node, a first electrode coupled to the current control sub-circuit, and a second electrode coupled to the element to be driven;

a third transistor having a control electrode coupled to the reset signal terminal, a first electrode coupled to the gating data signal terminal, and a second electrode coupled to the second node;

a second storage capacitor having a first terminal coupled to the initialization signal terminal and a second terminal coupled to the second node;

a fourth transistor having a control electrode coupled to the second node and a first electrode coupled to the current control sub-circuit;

a fifth transistor having a control electrode coupled to the pulse voltage signal terminal, a first electrode coupled to a second electrode of the fourth transistor;

a sixth transistor having a control electrode coupled to the second node, a first electrode coupled to a second electrode of the fifth transistor, and a second electrode coupled to the element to be driven.

15. The pixel driving circuit according to claim 10, wherein the gating sub-circuit is coupled to a second voltage signal terminal and the element to be driven;

the current control sub-circuit is coupled to the element to be driven, wherein the gating sub-circuit comprises:

a first transistor having a control electrode coupled to the scan signal terminal, a first electrode coupled to the gating data signal terminal, and a second electrode coupled to a first node;

a first storage capacitor having a first terminal coupled to an initialization signal terminal and a second terminal coupled to the first node;

a second transistor having a control electrode coupled to the first node, a first electrode coupled to the element to be driven, and a second electrode coupled to the second voltage signal terminal;

a third transistor having a control electrode coupled to the reset signal terminal, a first electrode coupled to the gating data signal terminal, and a second electrode coupled to the second node;

a second storage capacitor having a first terminal coupled to the initialization signal terminal and a second terminal coupled to the second node;

a fourth transistor having a control electrode coupled to the second node, a first electrode coupled to the element to be driven;

a fifth transistor having a control electrode coupled to the pulse voltage signal terminal, a first electrode coupled to a second electrode of the fourth transistor;

a sixth transistor having a control electrode coupled to the second node, a first electrode coupled to a second electrode of the fifth transistor, and a second electrode coupled to the second voltage signal terminal.

16. A display panel, comprising:

a pixel driving circuit according to claim 1;

an element to be driven which is coupled to the pixel driving circuit;

the element to be driven includes at least one light emitting diode connected in series in a current path of the pixel driving circuit; and the light emitting diode is a micro light emitting diode (micro LED) or a mini LED.

17. A display device, comprising the display panel according to claim 16.

18. A display panel, comprising:

a pixel driving circuit according to claim 6;

an element to be driven which is coupled to the pixel driving circuit;

the element to be driven includes at least one light emitting diode connected in series in a current path of the pixel driving circuit; and the light emitting diode is a micro light emitting diode (micro LED) or a mini LED.

19. A display panel, comprising:

a pixel driving circuit according to claim 10;

an element to be driven which is coupled to the pixel driving circuit;

the element to be driven includes at least one light emitting diode connected in series in a current path of the pixel driving circuit; and the light emitting diode is a micro light emitting diode (micro LED) or a mini LED.

* * * * *